United States Patent
Österlund

(10) Patent No.: US 11,249,758 B2
(45) Date of Patent: Feb. 15, 2022

(54) CONDITIONAL BRANCH FRAME BARRIER

(71) Applicant: Oracle International Corporation, Redwood Shores, CA (US)

(72) Inventor: Erik Österlund, Västerhaninge (SE)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/143,145

(22) Filed: Jan. 6, 2021

(65) Prior Publication Data

US 2021/0124583 A1 Apr. 29, 2021

Related U.S. Application Data

(63) Continuation of application No. 16/446,370, filed on Jun. 19, 2019, now Pat. No. 10,922,081.

(60) Provisional application No. 62/748,369, filed on Oct. 19, 2018.

(51) Int. Cl.
  *G06F 9/30* (2018.01)
  *G06F 9/52* (2006.01)
  *G06F 9/448* (2018.01)

(52) U.S. Cl.
  CPC ...... *G06F 9/30058* (2013.01); *G06F 9/30021* (2013.01); *G06F 9/4486* (2018.02); *G06F 9/522* (2013.01)

(58) Field of Classification Search
  None
  See application file for complete search history.

(56) References Cited

U.S. PATENT DOCUMENTS

| | | | |
|---|---|---|---|
| 5,765,007 A | 6/1998 | Rahman et al. | |
| 5,873,104 A | 2/1999 | Tremblay et al. | |
| 5,928,357 A * | 7/1999 | Underwood | G06F 9/3804 |
| | | | 712/235 |
| 6,769,004 B2 * | 7/2004 | Barrett | G06F 12/0269 |
| 7,546,587 B2 | 6/2009 | Marr et al. | |
| 2005/0235006 A1 | 10/2005 | Adl-Tabatabai et al. | |
| 2010/0114998 A1 * | 5/2010 | Steensgaard | G06F 12/0269 |
| | | | 707/813 |
| 2020/0081748 A1 | 3/2020 | Johnson et al. | |

OTHER PUBLICATIONS

"ZGC—Generations Revision 2," accessed at https://wiki.se.oracle.com/display/JPG/ZGC+-+Generations+Revision, Feb. 1, 2020, pp. 6.

(Continued)

*Primary Examiner* — Michael Sun
(74) *Attorney, Agent, or Firm* — Invoke

(57) ABSTRACT

Establishing a conditional branch frame barrier is described. A conditional branch in a function epilogue is used to provide frame-specific control. The conditional branch evaluates a return condition to determine whether to return from a callee function to a calling function, or to execute a slow path instead. The return condition is evaluated based on a thread local value. The thread local value is set such that returns to potentially unsafe frames in a call stack are prohibited. The prohibition to return to a potentially unsafe frame may be referred to as a "frame barrier." Additionally, the thread local value may be used to establish safepointing and/or thread local handshakes, both after execution of a function body and after execution of a loop body.

20 Claims, 16 Drawing Sheets

(56) References Cited

OTHER PUBLICATIONS

Wilson, P.R., et al., "A "Card-making" scheme for controlling intergenerational differences in generation—based garbage collection on stock hardware," ACM SIGPLAN Notices, vol. 24, Issue 5, May 1989, pp. 87-92.
Yuasa, T., "Real-time garbage collection on general-purpose machines," Journal of Systems and Software, vol. 11, Issue 3, <arch 1990, pp. 181-198.
Main—Main—OpenJDK Wiki, Created by Iris Clark, last modified by Per Liden, available online at <URL: https://wiki.openjdk.java.net/display/zgc/Main>, Oct. 15, 2020, 9 pages.
Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.
The Z Garbage Collector—Low Latency GC OpenJDK, available online at <http://cr.openjdk.java.net/~pliden/slides/ZGC-Jfokus-2018.pdf>, 2018, 96 pages.
Yang et al., "Improving Program Locality in the GC using Hotness," PLDI' 20, pp. 301-313, Jun. 15-20, 2020.
ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.
Click et al.; "The Pauseless GC Algorithm", VEE 05, Jun. 11-12, 2005, Chicago, Illinois, USA. Copyright 2005 ACM 1-59593-047-7/05/0006 . . . S5.00.
Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.
David Gnedt, "Fast Profiling in the HotSpot Java VM with Incremental Stack Tracing and Partial Safepoints," Faculty of Engineering and Natural Sciences, 2014, 57 pages.
Domani et al., "Implementing an On-the-fly Garbage Collector for Java," ACM SIGPLAN Notices, vol. 36, No. 1, 2000, pp. 155-166.
Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.
Open JDK, "HotSpot Glossary of Terms", 2006, Sun Microsystems, available at <https://openjdk.java.net/groups/hotspot/docs/HotSpotGlossary.html>, 6 pages.
Osterlund et al., "Block-Free Concurrent GC: Stack Scanning and Copying," International Symposium on Memory Management, vol. 51, 2016, 12 pages.
Robbin Ehn, "JEP 312: Thread-Local Handshakes," Hotspot Dash Dev at Openjdk Dot Java Dot Net, available at <http://openjdk.java.net/jeps/312>, 2018, 3 pages.
Yuasa et al., "Return Barrier," International Lisp Conference, 2002, 12 pages.

\* cited by examiner

Complete traversal of a frame from which a frame barrier blocks entry
1002

Shift a thread local value to indicate that the frame has been traversed
1004

Fig. 10

CONDITIONAL BRANCH FRAME BARRIER

INCORPORATION BY REFERENCE; DISCLAIMER

Each of the following applications are hereby incorporated by reference: application Ser. No. 16/446,370 filed on Jun. 19, 2019; application No. 62/748,369 filed on Oct. 19, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to call stacks. In particular, the present disclosure relates to conditional branch frame barriers.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 illustrates an example set of operations for handling a frame barrier, in accordance with one or more embodiments;

DETAILED DESCRIPTION

Figure 1:
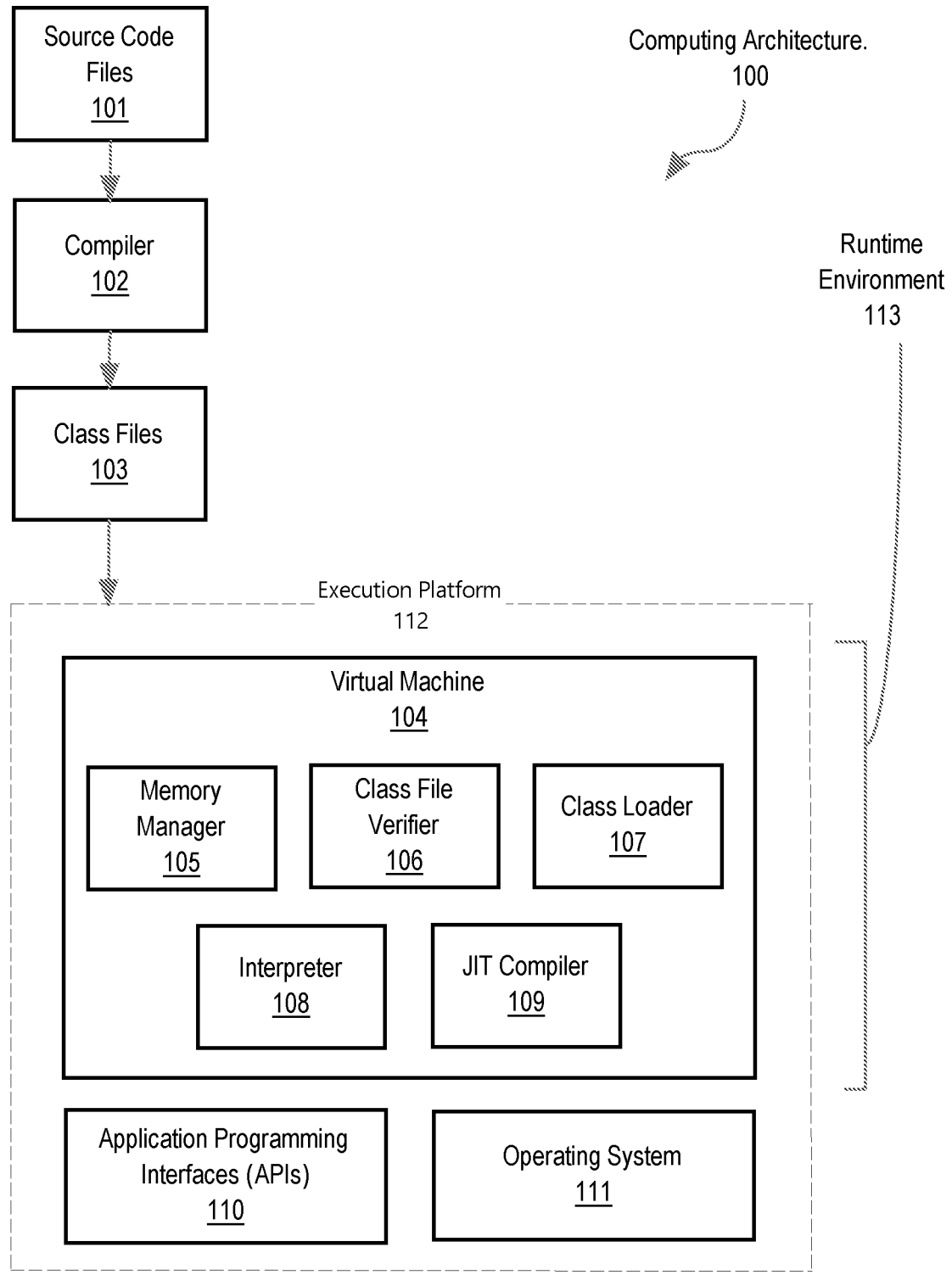
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. CALL STACKS AND FUNCTION STAGES
5. USING A CONDITIONAL BRANCH IN A FUNCTION EPILOGUE TO PROVIDE FRAME-SPECIFIC CONTROL
6. SETTING A CONDITION OF A CONDITIONAL BRANCH
7. PERFORMING VARIOUS CONTROLS ON EXECUTION OF A THREAD, INCLUDING FRAME-SPECIFIC CONTROL
8. HANDLING A FRAME BARRIER
9. USING A CONDITIONAL BRANCH BEFORE A BACK EDGE OF A LOOP
10. EXAMPLE EMBODIMENT
11. MISCELLANEOUS; EXTENSIONS
12. HARDWARE OVERVIEW

1. General Overview

One or more embodiments include using a conditional branch in a function epilogue to provide frame-specific control.

A conditional branch is inserted into a function epilogue. If a return condition is satisfied, then a slow path is executed before returning from a callee function to a calling function. If the return condition is not satisfied, then the callee function returns to the calling function without executing the slow path. The return condition is based on a comparison between a stack pointer and a thread local value. As an example, a return condition may be that a stack pointer is greater than or equal to a thread local value.

A thread local value is set such that returns to potentially unsafe frames in a call stack are prohibited. The thread local value is set such that a return condition is satisfied when evaluated in a function epilogue of a callee function that would otherwise return to a potentially unsafe frame. The thread local value is updated such that a previous prohibition to return to a particular frame is disarmed once the particular frame becomes safe, without waiting for all frames of the call stack to become safe (as is the case with thread local handshakes), or waiting for all call stacks of all threads to become safe (as is the case with safepointing). The prohibition to return to a potentially unsafe frame may be referred to herein as a "watermark frame barrier," or "frame barrier." Using a conditional branch that is evaluated based on a thread local value, a jump to a slow path may be performed without changing any return addresses in a call stack.

Some external processes (external to a program thread associated with a call stack) require snapshots of each frame of the call stack, wherein all snapshots reflect a state of the call stack at a particular time. Examples of such external processes include stack scanning in garbage collection (GC), a deoptimization process that replaces previously-optimized native code, stack sampling for inspecting an execution of a program, and stack loading when switching a stack from one thread to another thread. An external process need not capture a full snapshot of a call stack at a single point in time. The external process may traverse each frame at different times, as long as the frame has not been modified since the beginning of the external process. A frame that has been traversed by a particular external process may be considered "safe;" a frame that has not yet been traversed may be considered "unsafe."

One or more embodiments include using conditional branches before returning to a calling function and before jumping back to a beginning of a loop to serve multiple purposes. The multiple purposes include, for example, frame barriers (described above), safepointing, and thread local handshakes. A "return condition" is inserted in a function epilogue to determine whether to return to a calling function or to execute a slow path. A "loop condition" is inserted in a loop back edge to determine whether to jump back to a beginning of the loop or to execute a slow path. Both conditional branches involve evaluations of the same thread local value. As described above, a return condition is based on a comparison between a stack pointer and a thread local value. As an example, a return condition may be that a stack pointer is greater than or equal to a thread local value. Additionally, a loop condition is based on a flag associated with a thread local value. The flag may be, for example, a least significant bit (LSB) of the thread local value. As an example, a loop condition may be that the LSB of the thread local value is equal to zero.

Hence, a return condition and a loop condition, involving evaluations of the same thread local value, may serve multiple purposes. A frame barrier may be established by setting the thread local value such that a return condition would evaluate as true while a loop condition would evaluate as false. Meanwhile, a safepoint or thread local handshake may be established by setting the thread local value such that both the return condition and the loop condition would evaluate as true. If no slow paths are required, then the thread local value may be set such that both the return condition and the loop condition would evaluate as false. If either a return condition or a loop condition is true, then execution of a slow path first determines a purpose for the triggering of the condition, and then proceeds to execute a set of instructions associated with the purpose.

Accordingly, a single conditional branch inserted into a function epilogue is sufficient for achieving multiple purposes. A single conditional branch inserted before a loop back edge is sufficient for achieving multiple purposes. The conditional branch may control whether to enter a slow path to establish a frame barrier, safepoint, and/or thread local handshake.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
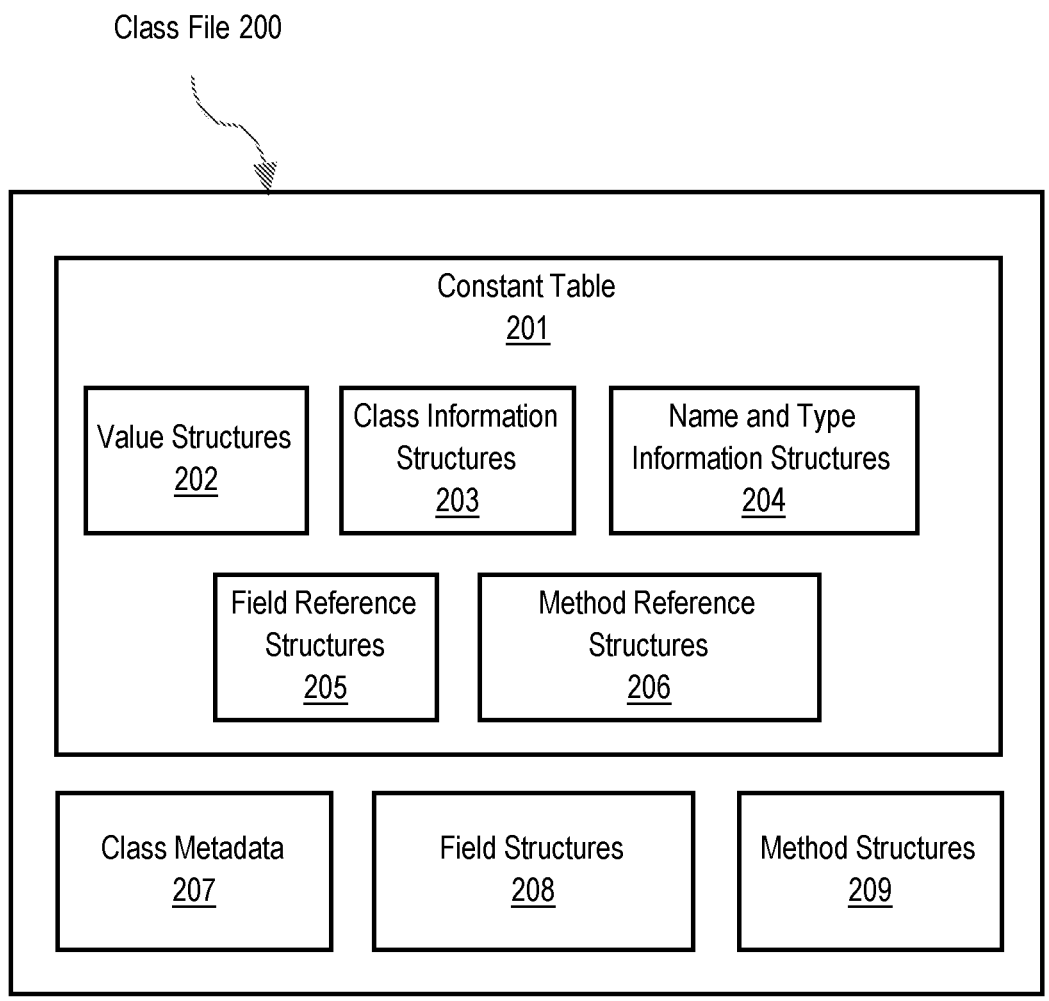
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment 113 and allocated concrete memory locations.

2.2 Example Virtual Machine Architecture

Figure 3:
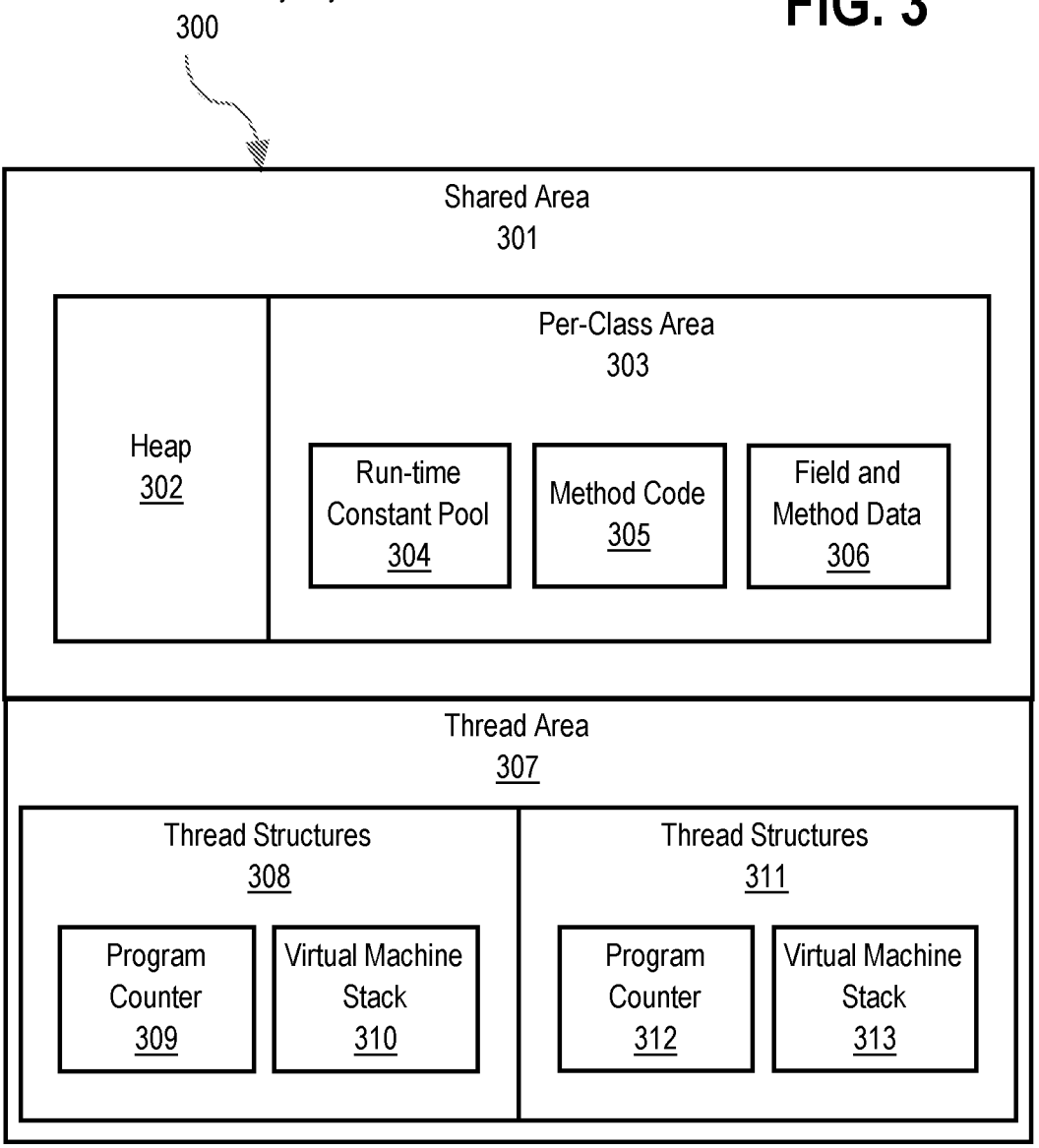
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
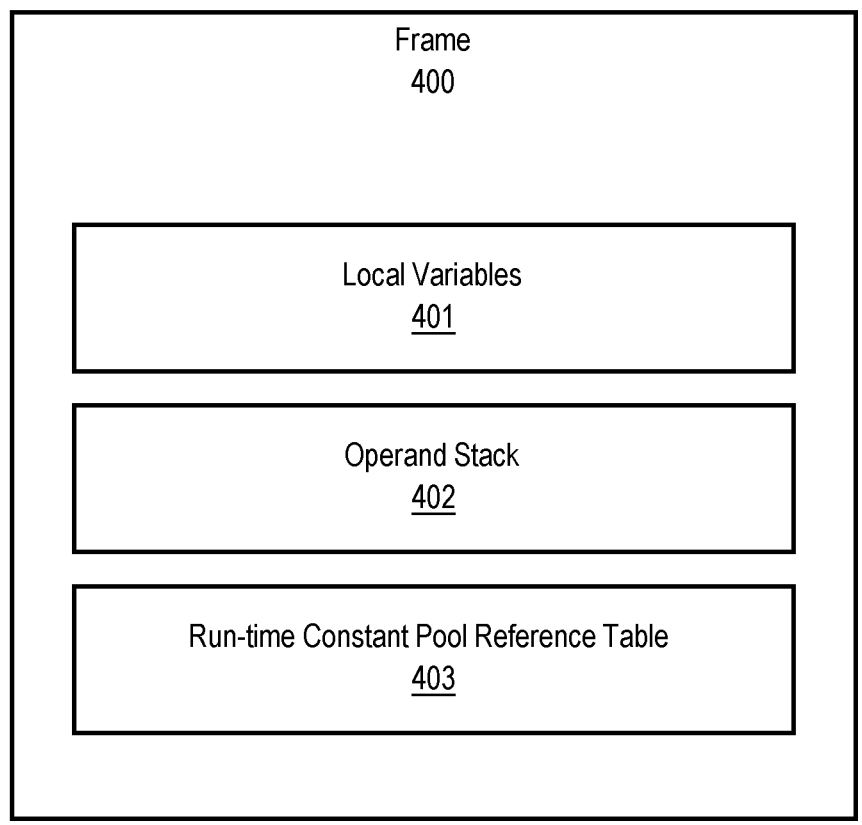
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking a class loader 107 which loads an initial class. Examples of class loaders 107 include a boot class loader, an extension class loader, and an application class loader. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
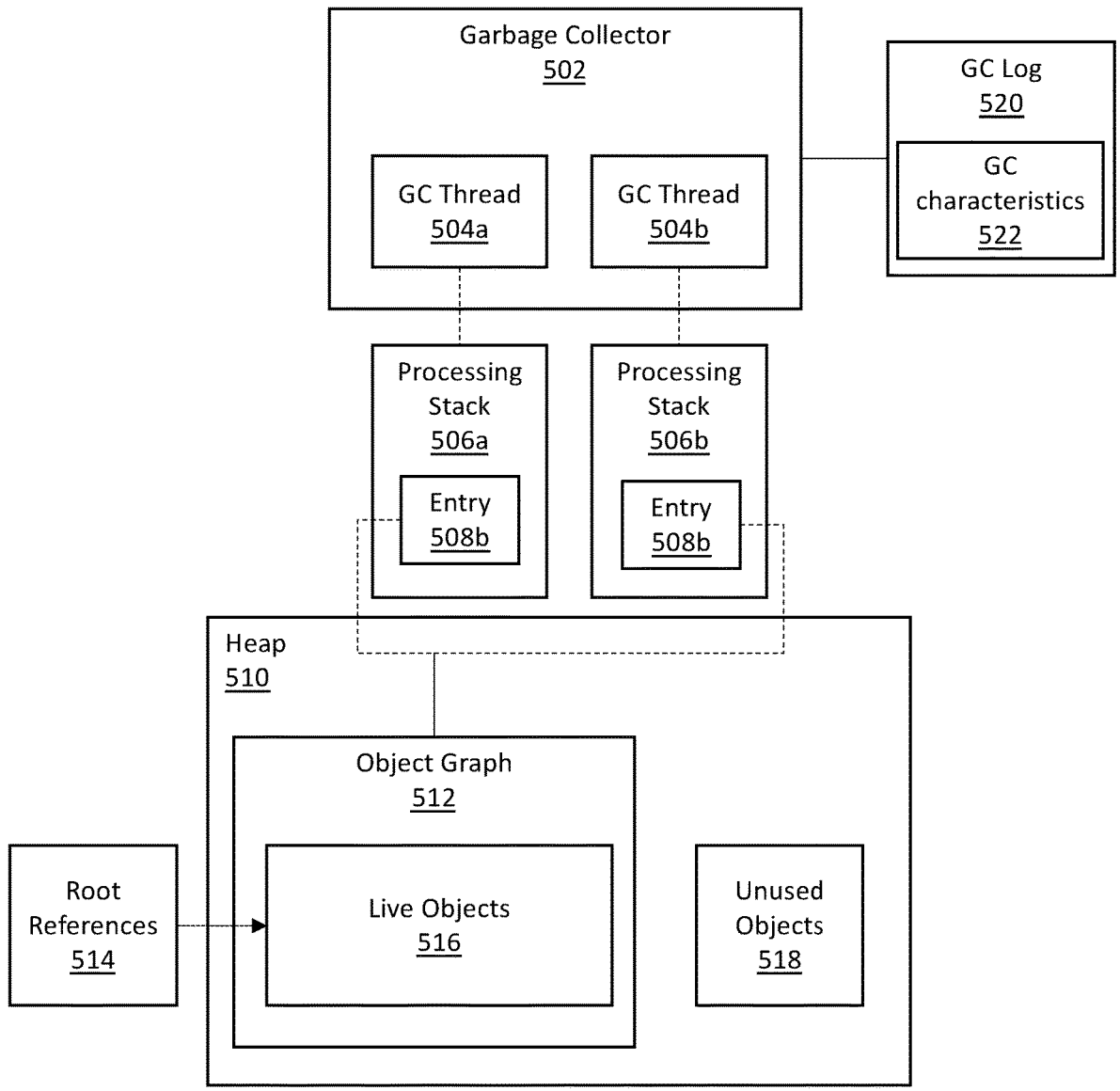
FIG. 5 illustrates an example garbage collection system for processing objects and/or items in a heap, in accordance with an embodiment.

FIG. 5 illustrates an example garbage collection system for processing objects and/or items in a heap, in accordance with an embodiment. FIG. 5 includes garbage collector (GC) 502, GC threads 504*a-b*, processing stacks 506*a-b*, entries 508*a-b*, heap 510, object graph 512, root references 514, live objects 516, and unused objects 518.

As described above, a heap 510 (or heap 302 described above) represents the run-time data area from which memory for class instances and arrays is allocated. The heap 510 stores objects that are created during execution of a program. The heap 510 stores both live objects 516 and unused objects 518.

An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects. An object array is explicitly created by an array creation expression. The length of the object array is established when the object array is created and is thereafter fixed. Each element or item in the object array is accessed by a numerical index, beginning with the index zero (0). As an example, a program may include the following pseudo-code:

String myobject="11/15/2011";
String[ ] myarray=new String[2];
myarray[0]="11/16/2011";
myarray[1]="11/17/2011";

In this example, myobject is a normal object whose type is String and whose value is "11/15/2011." Further, myarray is an object array that holds two elements, each of which is associated with a type of String.myarray is a set of two normal object references whose type is String. The value of the object referenced by the first element is "11/16/2011." The value of the object referenced by the second element is "11/17/2011."

In an embodiment, an object graph 512 is a graph including nodes and edges. A node represents a live object 516. An edge represents a reference from one live object 516 to another live object 516. The root nodes of the object graph 512 include objects pointed to by root references 514. The remaining nodes of the object graph 512 include objects pointed to by another live object.

In an embodiment, a root reference 514 is a pointer to an object from which a traversal of an object graph 512 begins. A garbage collector 502 begins traversing an object graph 512 at a particular object referenced by a root reference 514. The garbage collector 502 identifies the particular object as a live object 516. The garbage collector 502 traces the particular object to identify other objects referenced by the particular object. The garbage collector 502 identifies the other objects referenced by the particular object as live objects 516. The root references 514 used by a garbage collector 502 may be determined by analyzing registers, global fields, and stack frames at the moment when a garbage collection cycle is triggered. Examples of objects referenced by root references 514 include a class loaded by an application class loader, a live thread (such as thread structures 308-311), and a local variable or parameter (such as local variables 401 and/or operand stack 402).

In an embodiment, a live object 516 (also referred to as an "in use object") refers to an object that is currently being referenced by an executing program. The program includes at least one reference to the live object 516. A live object 516 is an object that is reachable from an object referenced by a root reference 514.

In an embodiment, an unused object 518 (also referred to as an "unreferenced object" or a "dead object") refers to an object that is no longer referenced by any part of the executing program. The unused object 518 may be removed from memory. The memory originally used to store the unused object 518 may be reclaimed to store new live objects 516.

In one or more embodiments, a garbage collector 502 refers to hardware and/or software configured to identify and remove unused objects 518 stored in a heap 510. The garbage collector 502 may perform a garbage collection cycle at a scheduled interval and/or upon an event trigger. As an example, when a heap (or a region thereof) reaches a threshold allocation, the garbage collector 502 may perform a garbage collection cycle to remove unused objects 518 stored at the heap (or a region thereof).

A garbage collector 502 may include one or more GC threads 504a-b to perform operations in parallel. A GC thread identifies live objects 516 by tracing through an object graph 512. After identifying live objects 516, the GC thread performs various operations and/or algorithms to remove unused objects 518. Specific operations performed in removing unused object depends on the type of garbage collector 502 used.

As an example, one type of garbage collector 502 is a copying collector. The copying collector uses at least two separately defined address spaces of the heap, referred to as a "from-space" and a "to-space." The copying collector identifies live objects 516 stored within an area defined as a from-space. The copying collector copies the live objects 516 to another area defined as a to-space. After all live objects 516 are copied from the from-space to the to-space, the area defined as the from-space is reclaimed. New memory allocation may begin at the first location of the original from-space.

As another example, another type of garbage collector 502 is a mark-and-sweep collector. The mark-and-sweep collector utilizes at least two phases: a mark phase and a sweep phase. During the mark phase, the mark-and-sweep collector marks each live object 516 with a "live" bit. The live bit may be, for example, a bit within an object header of the live object 516. During the sweep phase, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

The mark-and-sweep collector may be implemented as a parallel collector. The parallel collector includes multiple GC threads 504a-b working in parallel through the mark and sweep phases.

Additionally or alternatively, the mark-and-sweep collector may be implemented as a concurrent collector. At least some operations of a concurrent collector are performed while the executing program or application continues to run. Example stages of a concurrent collector include:

Stage 1: Identify the objects referenced by root references (this is not concurrent with the executing program)
Stage 2: Mark reachable objects from the objects referenced by the root references (this is concurrent)
Stage 3: Identify objects that have been modified as part of the execution of the program during Stage 2 (this is concurrent)
Stage 4: Re-mark the objects identified at Stage 3 (this is not concurrent)
Stage 5: Sweep the heap to obtain free lists and reclaim memory (this is concurrent)

As another example, another type of garbage collector 502 is a partially concurrent collector that also attempts to compact reclaimed memory areas. The heap is partitioned into a set of equally sized heap regions, each a contiguous range of virtual memory. The partially concurrent collector performs a concurrent global marking phase to determine the liveness of objects throughout the heap. After the marking phase completes, the partially concurrent collector identifies regions that are mostly empty. The partially concurrent collector collects these regions first, which often yields a large amount of free space. The partially concurrent collector concentrates its collection and compaction activity on the areas of the heap that are likely to be full of reclaimable objects, that is, garbage. The partially concurrent collector copies objects from one or more regions of the heap to a single region on the heap, and in the process both compacts and frees up memory. This evacuation is performed in parallel on multiprocessors to decrease pause times and increase throughput.

The partially concurrent collector pauses the executing application during one or more stages of the garbage collection cycle. The partially concurrent collector pauses the executing application to copy live objects to new regions. Additionally or alternatively, the partially concurrent collector pauses the executing application to identify and mark objects that have been modified, as part of the execution of the program, since start of the initial marking. Additionally or alternatively, the partially concurrent collector pauses the executing application to perform a cleanup phase, including identifying empty regions and determining old regions that are candidates for the next collection.

A heap may be separated into different regions. A first region stores objects that have not yet satisfied a criteria for being promoted from the first region to a second region; a second region stores objects that have satisfied the criteria for being promoted from the first region to the second region. Different types of garbage collectors 502 may be used for the different regions. Different GC processes may apply to the different regions. As an example, a heap may include a young generation space and an old generation space. A copying collector may perform garbage collection for the young generation space. The young generation space is separated into an Eden space and two survivor spaces. Objects are initially allocated in the Eden space. A GC cycle is triggered when the Eden space is full. Live objects 516 are copied from the Eden space to one of the survivor spaces, for example survivor space 1. At the next GC cycle, live objects 516 in the Eden space are copied to the other survivor space, for example survivor space 2. Live objects 516 in survivor space 1 are also copied to survivor space 2. Each time a live object 516 is copied, the live object 516 may be referred to as surviving a GC cycle. When a live object 516 survives at least a threshold number of GC cycles, the live object 516 is promoted from the young generation space to the old generation space.

Each GC thread is associated with a processing stack (such as processing stack 506a or 506b). As described above, a GC thread identifies live objects 516 by tracing through an object graph 512. The GC thread uses a processing stack to track the traversal of the object graph 512. The processing stack stores references to objects that (a) have been identified as part of the traversal process and (b) have not yet been processed in accordance with a set of garbage collection operations.

A processing stack has a limited number of entries. If a GC thread attempts to store an additional entry in a processing stack after the maximum number of entries has been reached, an error may be generated. Alternatively, if a GC thread attempts to store an additional entry in a processing stack after the maximum number of entries has been reached, the GC thread may allocate a new processing stack. In addition, each entry of the processing stack stores a limited number of bits. As an example, each entry may store a maximum of 64 bits.

Entries stored on a processing stack, which is associated with a particular GC thread, may be distributed to other GC threads for load balancing purposes. As an example, processing stack 506a of GC thread 504a may include ten entries. At the same time, processing stack 506b of GC thread 504b may include zero entries. Five entries from processing stack 506a may be distributed to GC thread 504b. GC thread 504b, rather than GC thread 504a, processes the entries distributed from processing stack 506a. As a result, each of GC thread 504a and GC thread 504b processes five entries. As illustrated in this example, the loads of GC thread 504a and GC thread 504b are thereby balanced.

In one or more embodiments, as the GC 502 performs a GC cycle, the GC characteristics 522 are detected and/or obtained. GC characteristics 522 include both static characteristics (characteristics that are fixed at the beginning of a VM) and dynamic characteristics (characteristics that change during a runtime of a program or application). Static GC characteristics include, for example, a maximum memory size of a young generation space, a minimum memory size of a young generation space, a maximum memory size of an old generation space, a minimum memory size of an old generation space, and a ratio of the memory size of a young generation space to the memory size of an old generation space. Dynamic GC characteristics include, for example, a memory size of a portion of a heap (or a region thereof) that is allocated before a GC cycle; a memory size of a portion of a heap (or region thereof) that is allocated after a GC cycle; a number of objects that are promoted from one region to another region during a GC cycle. A memory size of a portion of a heap that is allocated before a GC cycle may also be referred to herein as "size of allocated heap before GC." A memory size of a portion of a young generation space within a heap that is allocated before a GC cycle may also be referred to herein as "size of allocated young generation before GC."

A GC log 520 including GC characteristics 522 is generated. A GC 502 may generate the GC log 520 during a runtime of a program or application. Additionally or alternatively, the GC 502 may generate the GC log 520 after execution of the program of application has ended.

4. Call Stacks and Function Stages

In one or more embodiments, a call stack (also referred to herein as a "stack") stores information associated with different functions (and/or different bodies of code) called by a thread in a program. A call stack is used for keeping track of where to return upon completion of execution of a particular function (that is, an address of a call site in a calling function). Additionally or alternatively, a call stack is used for passing arguments from a calling function to a callee function. Additionally or alternatively, a call stack is used for storing local variables in the context of a particular function.

In one or more embodiments, each function corresponds to a frame on a call stack. When a new function is called, a new frame is pushed onto the stack. When execution of the function is complete, the frame is popped from the stack. A function currently being executed may be referred to as an "active function." An active function corresponds to a frame at the top of a call stack, which may be referred to as an "active frame." Depending on a configuration of a virtual machine, a call stack may grow in the positive or negative direction. As an example, when a new frame is pushed onto a call stack, a memory address corresponding to the new frame may be lesser than a memory address corresponding to a frame already on the call stack. The call stack is said to grow in the negative direction. As another example, when a new frame is pushed onto a call stack, a memory address corresponding to the new frame may be greater than a memory address corresponding to a frame already on the call stack. The call stack is said to grow in the positive direction.

In one or more embodiments, a frame pointer references an address within an active frame that corresponds to the top of the call stack before any local variables are stored in that frame. In one or more embodiments, a stack pointer references an address that corresponds to the top of the call stack, as the call stack grows or shrinks. In one or more embodiments, a stack pointer is maintained in a register. As an example, in an x86_86 machine, a stack pointer is stored in a RSP register. However, a frame pointer may be but is not necessarily maintained in any register. In an embodiment, no register stores a value for the frame pointer (thereby freeing up a register for other purposes); rather, a value for the frame pointer (that is, an address within an active frame that corresponds to the top of the call stack before any local variables are stored in that frame) is computed based on the stack pointer and/or other information associated with the program, such as a program counter. As an example, based on the program counter, the instructions that have been executed may be determined. The local variables that are stored based on the executed instructions may be determined. The size of the local variables may be determined. Therefore, the value of the frame pointer may be computed as the stack pointer minus the size of the local variables.

In one or more embodiments, multiple call stacks are concurrently used in a virtual machine, each call stack associated with a different thread of the virtual machine. The threads in a virtual machine may include, for example, one or more program threads, one or more garbage collection (GC) threads, and one or more stack sampling threads. Additional and/or alternative threads may be used.

In one or more embodiments, each program process and/or thread is associated with a thread local value (also referred to herein as a "process-specific value"). A thread local value is a value specific to a single program thread in a virtual machine. Only a particular program thread corresponding to a particular thread local value may read and/or write to the particular thread local value; other program threads cannot read and/or write to the particular thread local value. However, other types of threads (such as a GC thread) may read and/or write to a thread local value of a program thread. In one or more embodiments, a thread local value is maintained in a memory location, which is referenced by a value stored in a register. As an example, in an x86_64 machine, a R15 register stores a value that references a memory location in which a thread local value is stored. Each thread (in a multi-threaded program) is associated with a respective register state. When switching threads, a value stored in a R15 register of the outgoing thread is saved in memory, and a value previously saved in memory for the R15 register for the incoming thread is loaded into the R15 register. In a GC context, a program thread may also be referred to as a "mutator thread," because a mutator thread may mutate the contents of a heap as a GC thread attempts to perform a GC cycle.

Figure 6:
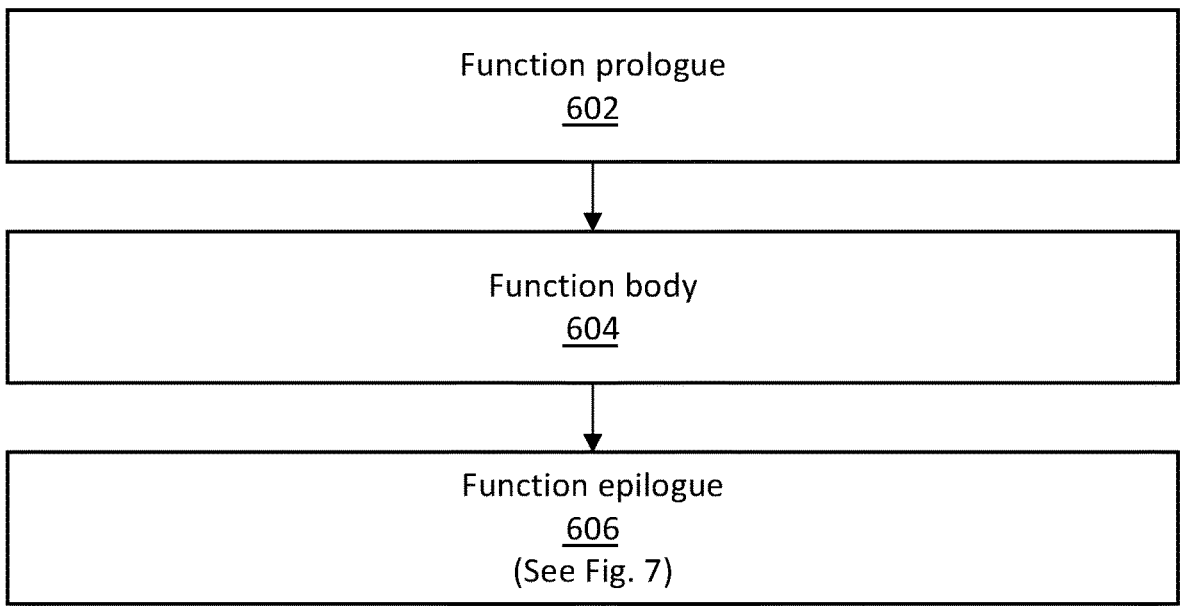
FIG. 6 illustrates an example set of stages of execution of a function, in accordance with one or more embodiments.

In one or more embodiments, overhead instructions, in a function prologue 602 and/or function epilogue 606, are executed to switch between different frames on a call stack. Hence, there may be three stages in the execution of a function: function prologue 602, function body 604, and function epilogue 606. The function prologue 602 and/or function epilogue 606 constitute procedural functionality for integrating core code into a body of other code. The core code functionality is not for integrating the core code into the body of other code, but rather to accomplish a function not performed by the body of other code. FIG. 6 illustrates an example set of stages of execution of a function, in accordance with one or more embodiments. In one or more embodiments, more or fewer stages than the stages illustrated in FIG. 6 may be used.

In one or more embodiments, a function prologue 602 includes instructions that prepare a new frame on a call stack for a callee function. A function prologue 602 includes, for example, pushing a return address on the call stack (that is, an address of a call site within a calling function), and shifting a stack pointer to include the information pushed onto the call stack thus far (such as, the return address and, optionally, the value of the frame pointer) and memory reserved for local variables associated with the callee function.

In one or more embodiments, a function body 604 includes instructions necessary for achieving a purpose of a function. As an example, a purpose of a function may be to determine a sum of two variables. A function body of the function may include instructions that determines the respective values of the two variables, and adds the two values together.

In one or more embodiments, a function epilogue 606 includes instructions that restore a frame on a call stack for a calling function. A function epilogue 606 includes instructions performed after a function body 604 (a functional portion of code) but before a return call from the callee function. A function epilogue 606 includes, for example, shifting a stack pointer to be equal a frame pointer (an address corresponding to the top of the call stack before local variables were stored for the active frame), and returning to the calling site. Additionally, a function epilogue 606 may include polling prior to returning to the calling site. Polling may include determining whether a return condition is satisfied. Polling may include executing a conditional branch, as further described below with reference to FIG. 7.

In one or more embodiments, a first set of code is compiled and/or interpreted into a second set of code. The first set of code specifies a function body of a function. The first set of code does not specify any instructions that are directly compiled and/or interpreted into instructions of the function prologue 602 and function epilogue 606. During compilation and/or interpretation, the compiler and/or interpreter inserts instructions into the second set of code that constitute the function prologue 602 and function epilogue 606.

As an example, the following source code may be executed:

```
public static void main(String[ ] args) {
    System.out.println("Hello World");
}
```

In the above example, main calls println. Hence, main may be referred to as a "calling function," and println may be referred to as a "callee function." On a call stack, a frame corresponding to main is first pushed. When main calls println, a frame corresponding to println is pushed. Execution of a function body of println involves printing "Hello World." After execution of the function body, a function epilogue of println is executed. A function epilogue of println includes operations such as moving a stack pointer, moving a frame pointer, polling, and returning to the calling function main. Reviewing the example source code, the example source code does not include any line corresponding to operations such as moving a stack pointer, moving a frame pointer, polling, and returning to the calling function main (setting a program counter to reference an instruction associated with a call site in main). Hence, as described above, the function epilogue includes code that is not directly compiled and/or interpreted from the source code; rather the function epilogue is inserted by a compiler and/or interpreter.

In one or more embodiments, a function may include a loop. A loop is a programming structure that repeats a sequence of instructions until a specific condition is met. A loop body includes instructions that are executed if and only if a loop's condition is met. A loop body includes instructions necessary for achieving a purpose of a loop. A loop body is compiled and/or interpreted based on source code. A back edge of a loop is a jump back into a previously-executed instruction. One or more instructions corresponding a back edge does not correspond to any instructions in the source code. The instruction corresponding a back edge are inserted by a compiler and/or interpreter. Optionally, a compiler and/or interpreter may also insert instructions for polling prior to the back edge instruction. Polling may include determining whether a loop condition is satisfied. Polling may include executing a conditional branch, as further described below with reference to FIG. 11.

As an example, the following source code may be executed:

```
public static void main(String[ ] args) {
    for (int x=1; x<5; x++) {
        System.out.println("Value of x:" + x);
    }
}
```

In the above example, for (int x=1; x<5; x++) may be referred to as a loop header. The loop header specifies the loop condition, which in the above example is x<5. A loop body is the code within the brackets after the loop header, which in the above example is System.out.println ("Value of x:"+x);. Execution of the loop body involves printing the value of x. After one iteration of the loop body, polling and back edge instructions are executed. The back edge instruction includes a jump back to the beginning of the loop body. Reviewing the example source code, the example source code does not include any line corresponding to operations such as polling, and jumping back to the beginning of the loop body (setting a program counter to reference an instruction at the beginning of the loop body). Hence, as described above, polling and back edge instructions are not directly compiled and/or interpreted from the source code; rather polling and back edge instructions are inserted by a compiler and/or interpreter.

In some embodiments, polling may be disabled in certain circumstances. As an example, polling may be disabled for loops that have a finite number of iterations. As another example, loop strip mining may be used to optimize execution of a loop. Loop strip mining transforms a loop into an external loop and an internal loop. Polling may be disabled for the internal loop. Polling may be allowed on the external loop. Therefore, certain iterations of the loop (the iterations performed by the internal loop) may be performed without the poll. Meanwhile, other iterations of the loop (the iterations performed by the external loop) may be performed with the poll.

Figure 7:
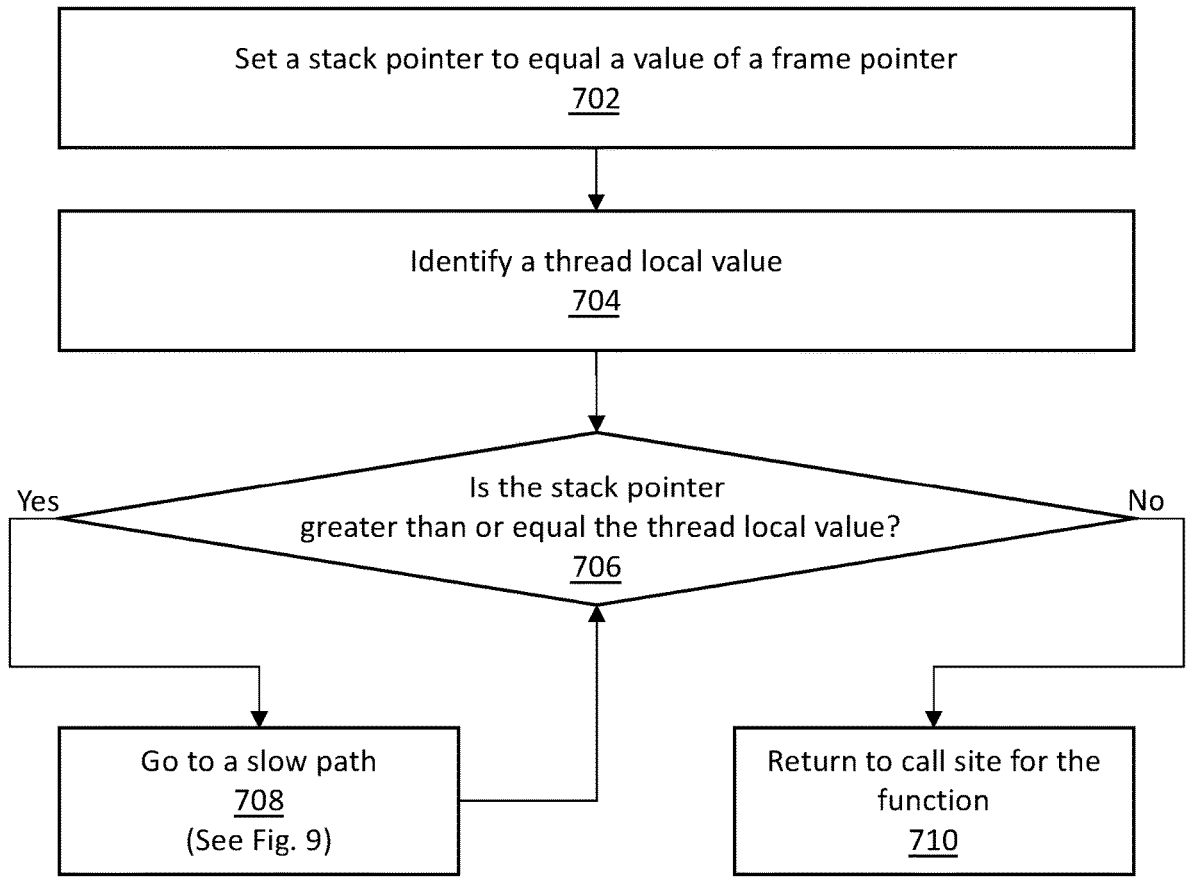
FIG. 7 illustrates an example set of operations for using a conditional branch in a function epilogue to provide frame-specific control, in accordance with one or more embodiments.

5. Using a Conditional Branch in a Function Epilogue to provide Frame-Specific Control FIG. 7 illustrates an example set of operations for using a conditional branch in a function epilogue to provide frame-specific control, in accordance with one or more embodiments. Operations of FIG. 7 are executed after execution of a function body of an active function. At the completion of the execution of the function body of the active function, the active frame of the call stack (the frame at the top of the call stack) corresponds to the active function. A stack pointer references the top of the call stack, which currently includes the local variables associated with the active function. Optionally, a frame pointer references the top of the call stack before the local variables associated with the active function were added to the call stack. In one or more embodiments, operations of FIG. 7 are performed by a program process, which may be executed on a same thread or a different thread than an external process (such as, a garbage collection process).

One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include setting a stack pointer to equal a value of a frame pointer (Operation 702). A value of the frame pointer is identified. Depending on a configuration of a virtual machine, the frame pointer may or may not be maintained in a register. If the frame pointer is maintained in a register, then the value of the frame pointer is retrieved from the register. If the frame pointer is not maintained in a register, then the value of the frame pointer may be computed based on the stack pointer and/or other information associated with the program, such as a program counter.

A register corresponding to the stack pointer is identified. As an example, in an x86_64 machine, a RSP register corresponding to the stack pointer is identified. The value of the frame pointer is stored into the register. Hence, the stack pointer is set to the value of the frame pointer. Both the stack pointer and the frame pointer reference the top of the call stack before local variables associated with the active function were added to the call stack.

One or more embodiments include identifying a thread local value (Operation 704). The thread local value is loaded from a register and/or another memory location. As an example, in an x86_64 machine, a thread local value is loaded from a R15 register.

The thread local value may be set by one or more processes and/or threads for achieving one or more purposes using the conditional branch. Examples of operations for setting the thread local value are further described below with reference to FIG. 8.

One or more embodiments include determining whether the stack pointer is greater than or equal to the thread local value (Operation 706). Polling is performed as part of a function epilogue. During polling, a return condition is tested.

Depending on a configuration of a virtual machine, a call stack may grow in the positive or negative direction. In an embodiment, the call stack grows in the negative direction. Hence, a return condition to be tested is whether the stack pointer is greater than or equal to the thread local value (as illustrated). In an alternative embodiment, the call stack grows in a positive direction. Hence, a return condition to be tested is whether the stack pointer is less than or equal to the thread local value.

If the stack pointer is greater than or equal to the thread local value, then one or more embodiments include going to a slow path (Operation 708). Examples of operations of a slow path are further described below with reference to FIG. 9. After execution of the slow path, the program thread returns to a poll site. Polling is performed to determine whether the stack pointer is greater than or equal to the thread local value (Operation 706).

If the stack pointer is not greater than or equal to the thread local value, then one or more embodiments include returning to a call site for the function (Operation 710). The program thread returns to a call site for the function, that is, the location of an instruction that called the function.

6. Setting a Condition of a Conditional Branch

Figure 8A:
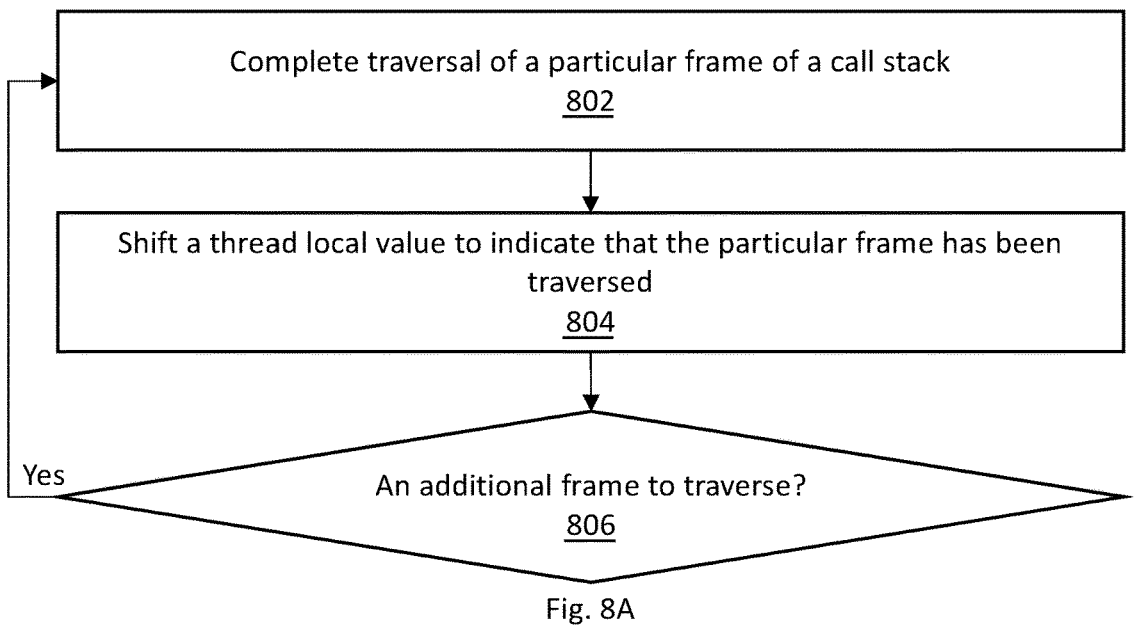
FIGS. 8A-8C illustrates an example set of operations for setting a condition of a conditional branch, in accordance with one or more embodiments.
Figure 8B:
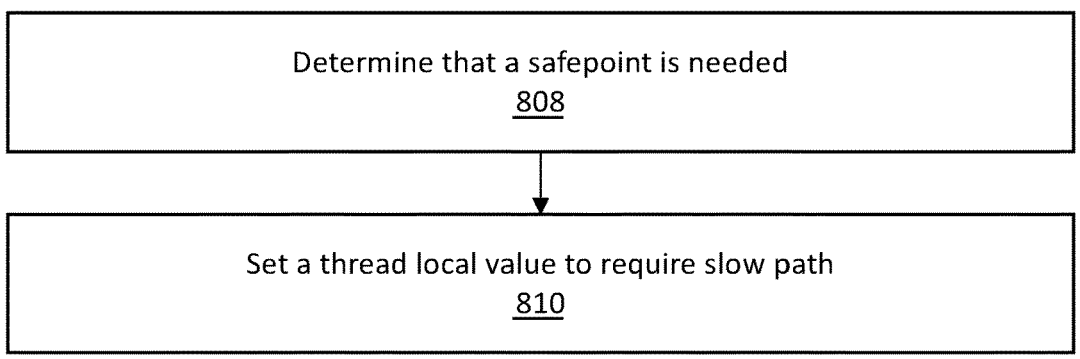
Figure 8C:
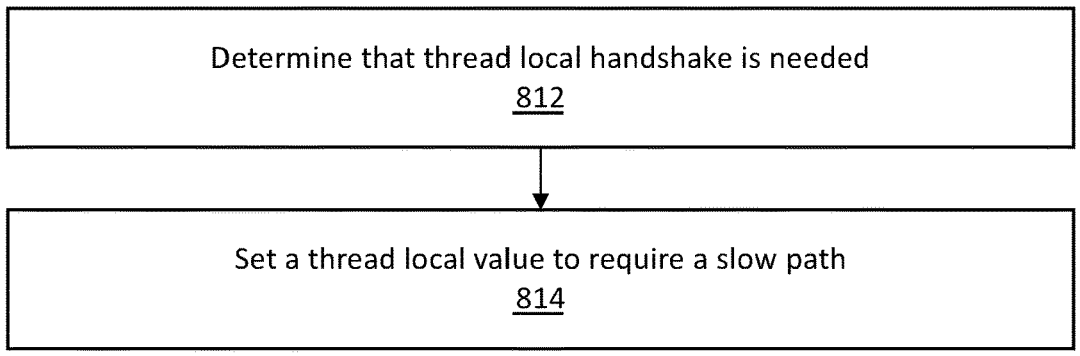

FIGS. 8A-8C illustrates an example set of operations for setting a condition of a conditional branch, in accordance with one or more embodiments. Setting a condition of the conditional branch includes setting a thread local value that is used in the conditional branch, as described at Operation 706 of FIG. 7. When setting the thread local value, there is no need to wait for a suspension or handshake by the program thread. In one or more embodiments, operations of FIGS. 8A-8C are performed by an external process and/or thread that is external to a program process associated with the thread local value. The external process and the program process may be executed on a same thread or different threads. The external process requires snapshots of each frame of a call stack associated with the program thread, wherein all snapshots reflect a state of the call stack at a particular time. Examples of such external processes include stack scanning in garbage collection (GC), a deoptimization process that replaces previously-optimized native code, stack sampling for inspecting an execution of a program, and stack loading when switching a stack from one program thread to another program thread. An external process need not capture a full snapshot of a call stack at a single point in time. The external process may traverse each frame at different times, as long as the frame has not been modified since the beginning of the external process.

One or more operations illustrated in FIGS. 8A-8C may be modified, rearranged, or omitted all together. Accordingly, the particular sequence of operations illustrated in FIGS. 8A-8C should not be construed as limiting the scope of one or more embodiments.

FIG. 8A illustrates an example set of operations for setting a condition of a conditional branch to establish a frame barrier for a frame of a call stack.

One or more embodiments include completing traversal of a particular frame of a call stack (Operation 802). An external process traverses each frame of a call stack. At a particular point in time, traversal of a subset of frames on a call stack may have been completed, while traversal of another subset of frames on the call stack is not yet completed.

As an example, a GC thread may need to scan a call stack to identify root references. The GC thread may scan the call stack frame by frame. After scanning a particular frame, traversal of the particular frame may be referred to as completed.

As another example, a GC thread may have reclaimed memory by copying objects from one region of memory to another region of memory. The GC thread may need to scan a call stack to remap references to the objects in the new memory locations. The GC thread may scan the call stack frame by frame. After scanning a particular frame, traversal of the particular frame may be referred to as completed.

As another example, a deoptimization process may need to be performed. A JIT compiler performs speculative optimizations that may become invalidated during runtime. As an example, a JIT compiler may make an assumption about a call being monomorphic. However, concurrent class loading may make the call polymorphic, thereby violating the assumption. When certain optimized code is no longer valid, the code is discarded. The deoptimization process may need to scan a call stack to remap, re-compile, and/or re-interpret code that is no longer valid. The deoptimization process may scan the call stack frame by frame. After scanning a particular frame, traversal of the particular frame may be referred to as completed.

As another example, a stack sampling process may need to obtain a sample of a full call stack. The stack sampling process may be performed by, for example, a Java Flight Recorder. The stack sampling process may scan the call stack frame by frame. After scanning a particular frame, traversal of the particular frame may be referred to as completed.

As another example, a stack loading process may need to switch execution associated with a call stack from one fiber to another fiber. A fiber is a user-mode thread managed by the VM (as opposed to a kernel thread implemented by an operating system). The stack loading process may traverse the call stack frame by frame, to switch execution associated with each frame from one fiber to another fiber. After switching execution of a particular frame, traversal of the particular frame may be referred to as completed.

One or more embodiments include shifting a thread local value to indicate that the particular frame has been traversed (Operation 804). After traversal of the particular frame is completed, the external process identifies a thread local value specific to the program thread associated with the call stack. The external process shifts the thread local value to indicate that the particular frame has been traversed.

In an embodiment, a call stack grows in a negative direction. The frames in a call stack, from bottom of the stack to top of the stack, may include: Frame A, Frame B. At a first time period, an external process may complete traversal of Frame B, but not of Frame A. The external process may set the thread local value to be (a) less than or equal to an address referenced by a frame pointer associated with Frame B, and (b) greater than an address associated with memory reserved for local variables of Frame B. Hence, the thread local value indicates that Frame B has been traversed, but Frame A has not been traversed.

In another embodiment, a call stack grows in a positive direction. The frames in a call stack, from bottom of the stack to top of the stack, may include: Frame A, Frame B. At a first time period, an external process may complete traversal of Frame B, but not of Frame A. The external process may set the thread local value to be (a) greater than or equal to an address referenced by a frame pointer associated with Frame B, and (b) less than an address associated with memory reserved for local variables of Frame B. The thread local value indicates that Frame B has been traversed, but Frame A has not been traversed.

In an embodiment, the external process may also set the thread local value such that a least significant bit (LSB) of the thread local value is one. The LSB of the thread local value serves as a flag to be used in a loop condition, as further described below with reference to Operation 1106 of FIG. 11.

As an example, frames on a call stack may be associated with an 8-byte alignment. Hence the three least significant bits for any address of a frame on the call stack is zero. An external process may set the thread local value such that (a) the thread local value is less than or equal to an address referenced by a frame pointer associated with a frame that has been most recently processed, (b) the thread local value is greater than an address associated with memory reserved for local variables of the frame that has been most recently processed, and (c) the LSB of the thread local value is equal to one. Hence, the thread local value may be, for example, the address referenced by the frame pointer associated with the frame that has been most recently processed minus 7.

One or more embodiments include determining whether there is an additional frame to traverse (Operation 806). If there is an additional frame of the call stack to traverse, the external process iterates Operation 802 with respect to the additional frame. After traversing the additional frame, the external process iterates Operation 804 to shift the thread local value to indicate that the additional frame has been traversed.

Therefore, the thread local value tracks the progress of the external process. As an external process traverses each frame of a call stack, the external process shifts the thread local value to indicate the frame that has just been traversed. As described above, a return condition at Operation 706 depends on the thread local value. By tracking a progress of an external process using the thread local value, the return condition indicates whether an active function is returning to a frame that has been traversed or not. If the active function is returning to a frame that has not been traversed, then there is a jump to a slow path. If the active function is returning to a frame that has been traversed, then there is a return to the frame.

FIG. 8B illustrates an example set of operations for setting a condition of a conditional branch to establish a safepoint.

One or more embodiments include determining that a safepoint is needed (Operation 808). An external process determines that a safepoint is needed. A safepoint is a suspension of execution of a program by all program threads. As an example, a GC thread may perform a particular operation that requires execution of a program by all threads to be suspended.

Further embodiments and examples relating to safepoints are described in "Safepoint," in *HotSpot Glossary of Terms*, at http://openjdk.java.net/groups/hospot/docs/HotSpotGlossary.html (last accessed on Oct. 12, 2018), included herein as Appendix A, and incorporated by reference herein.

One or more embodiments include setting a thread local value to require a slow path (Operation 810). In an embodiment, a call stack grows in a negative direction. The external process sets the thread local value to a minimum value (all 0's). In another embodiment, a call stack grows in a positive direction. The external process sets the thread local value to a maximum value (all 1's).

As described above, a return condition at Operation 706 depends on the thread local value. By setting the thread local value such that the return condition always evaluates as true, a slow path is executed.

In order to establish a safepoint, a thread local value of each program thread in a VM is set to require the slow path. All program threads execute the slow path in order to suspend execution of the program until the external process traverses all program threads.

FIG. 8C illustrates an example set of operations for setting a condition of a conditional branch to establish a thread local handshake.

One or more embodiments include determining that a thread local handshake is needed (Operation 812). An external process determines that a thread local handshake is needed. A thread local handshake (also referred to as a "process-specific handshake") is a suspension of execution of a program by a particular program process and/or thread. As an example, a GC thread may perform a particular operation that requires execution of a program by a particular thread to be suspended.

Further embodiments and examples relating to thread local handshakes are described in JEP 312: Thread Local Handshakes, at http://openjdk.java.net/jeps/312 (last accessed on Oct. 12, 2018), included herein as Appendix B, and incorporated by reference herein.

One or more embodiments include setting a thread local value to require a slow path (Operation 814). In an embodiment, a call stack grows in a negative direction. The external process sets the thread local value to a minimum value (all 0's). In another embodiment, a call stack grows in a positive direction. The external process sets the thread local value to a maximum value (all 1's).

As described above, a return condition at Operation 706 depends on the thread local value. By setting the thread local value such that the return condition always evaluates as true, a slow path is executed.

The external process may determine whether to establish a thread local handshake for each program thread individually. As an example, an external process may initially establish a thread local handshake for each program thread of a virtual machine. The external process may set the thread local values of the program threads as the minimum value (all 0's). When the external process completes traversal of a particular program thread, the external process may release the thread local handshake of the particular program thread. The external process may modify the thread local value associated with the particular program thread. The external process may set the thread local value associated with the particular program thread to the maximum value (all 1's) or another value. Meanwhile, the thread local values of the other program threads, which have not yet been traversed, may remain the same.

Figure 9:
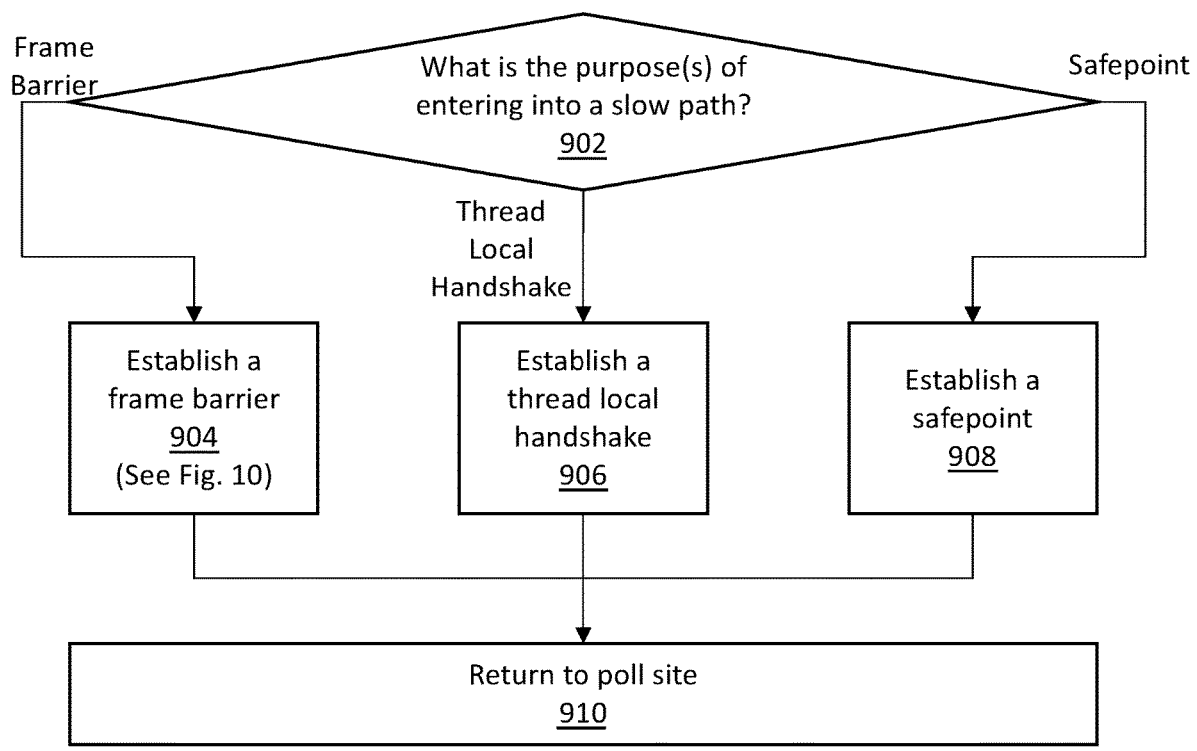
FIG. 9 illustrates an example set of operations for performing various controls on execution of a thread, including frame-specific control, in accordance with one or more embodiments.

7. Performing Various Controls on Execution of a Thread, including Frame-Specific Control FIG. 9 illustrates an example set of operations for performing various controls on execution of a thread, including frame-specific control, in accordance with one or more embodiments. After determining to enter a slow path at Operation 708 of FIG. 7, operations of FIG. 9 are executed. In one or more embodiments, operations of FIG. 9 are performed by a program process, which may be executed on a same thread or a different thread than an external process (such as, a garbage collection process).

One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments include determining one or more purposes of entering a slow path (Operation 902). Registers and/or other attributes associated with a virtual machine may be evaluated to determine a purpose of entering the slow path.

In an embodiment, a global value associated with the virtual machine indicates whether a safepoint is needed. The global value has at least three possible states: synchronizing, synchronized, not synchronized. If the global value indicates the "synchronized" or "synchronizing" state, then yielding to the safepoint and waiting for the safepoint to finish is required.

In an embodiment, each program thread is associated with a "handshake operation" field. If the "handshake operation" field is NULL, there is no handshake to reply to. If there is an operation in the "handshake operation" field, then the operation is executed. A thread local handshake is needed during the execution of the operation.

In an embodiment, when jumping into the virtual machine from a slow path, a "last frame" is recorded. If the thread local value is not the minimum value (all 0's) nor the maximum value (all 1's), then the thread local value is compared with the "last frame" to determine whether the "last frame" is unsafe. If the "last frame" is unsafe, then a frame barrier is needed until the "last frame" is safe.

If a frame barrier is needed, one or more embodiments include establishing a frame barrier (Operation 904). Examples of operations for establishing a frame barrier are further described below with reference to FIG. 10.

If a thread local handshake is needed, one or more embodiments include establishing a thread local handshake (Operation 906). An operation indicated in the "handshake operation" field is executed. The program thread itself and/or an external process may execute the handshake operation. During execution, the thread local value remains the same as the value set at Operation 814. After the call stack associated with the program thread is traversed by the handshake operation, the thread local value is modified to indicate that the thread local handshake is no longer needed for the program thread.

In an embodiment, whether a program thread or an external process executes the handshake operation depends upon which mode the program thread currently operates. Examples of modes include managed mode and unmanaged mode. A program thread is in managed mode when the program thread executes code that is interpreted from source code. A program thread is in unmanaged mode when the program thread executes native C code or the program thread is associated with a particular lock. When a program thread is in managed mode, the program thread itself (rather than the external process) executes the handshake operation. When a program thread is in unmanaged mode, the external process executes the handshake operation, without necessarily waiting for the program thread to return to managed mode. When the program thread is in unmanaged mode, the external process may safely execute the handshake operation for the program thread because, if and when the program thread wakes up to managed mode, the program thread would run into the poll. Running into the poll would make the program thread wait until the external process has completed the handshake operation. In other embodiments, whether a program thread or an external process executes the handshake operation depends upon additional and/or alternative factors.

If a safepoint is needed, one or more embodiments include establishing a safepoint (Operation 908). The program thread itself and/or an external process may execute a particular operation on call stacks of the virtual machine. The particular operation requires and/or triggers the safepoint. During execution, the thread local value remains the same as the value set at Operation 810. After every call stack is traversed, the thread local value is modified to indicate that the safepoint is no longer needed.

In an embodiment, whether a program thread or an external process executes the particular operation depends upon which mode the program thread currently operates. When a program thread is in managed mode, the program thread itself (rather than the external process) executes the particular operation. When a program thread is in unmanaged mode, the external process executes the particular operation, without necessarily waiting for the program thread to return to managed mode. In other embodiments, whether a program thread or an external process executes the particular operation depends upon additional and/or alternative factors.

One or more embodiments include returning to a poll site (Operation 910). After the operations causing the need for the frame barrier, the thread local handshake, or the safepoint are executed, then there is return to the poll site. The program thread returns to Operation 706. The return condition is checked again, using the current thread local value.

8. Handling a Frame Barrier

FIG. 10 illustrates an example set of operations for handling a frame barrier, in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include completing traversal of a frame from which a frame barrier blocks entry (Operation 1002). A program thread and/or an external process traverses a frame from which a frame barrier blocks entry.

In an embodiment, an external process traverses the frame from which the frame barrier blocks entry. Examples of operations for traversing, by an external process, a frame are described above with reference to Operation 802.

In another embodiment, a program thread may traverse the frame, using operations similar to those described above with reference to Operation 802. As an example, references in a call stack may need to be remapped as part of a GC cycle. A program thread may perform the remapping of references for a particular frame. As another example, concurrent marking may need to be performed. A program thread may mark the references in a particular frame. As another example, objects may need to be relocated. A program thread may move the objects referenced by a particular frame and remap pointers to reference the new locations of the objects.

In an embodiment, whether a program thread or an external process traverses the frame from which the frame barrier blocks entry depends upon which mode the program thread currently operates. When a program thread is in managed mode, the program thread itself (rather than the external process) traverses the frame. When a program thread is in unmanaged mode, the external process traverses the frame, without necessarily waiting for the program thread to return to managed mode. In other embodiments, whether a program thread or an external process traverses the frame from which the frame barrier blocks entry depends upon additional and/or alternative factors.

One or more embodiments include shifting a thread local value to indicate that the frame has been traversed (Operation 1004). The program thread and/or the external process shifts the thread local value to indicate that the frame has been traversed. The thread local value may be shifted even if the entire call stack has not yet been traversed.

Examples of operations for shifting, by the external process, a thread local value to indicate that a frame has been traversed are described above with reference to Operation 804.

In an embodiment, a program thread may shift the thread local value to indicate that the frame has been traversed, using operations similar to those described above with reference to Operation 804.

9. Using a Conditional Branch before a Back Edge of a Loop

Figure 11:
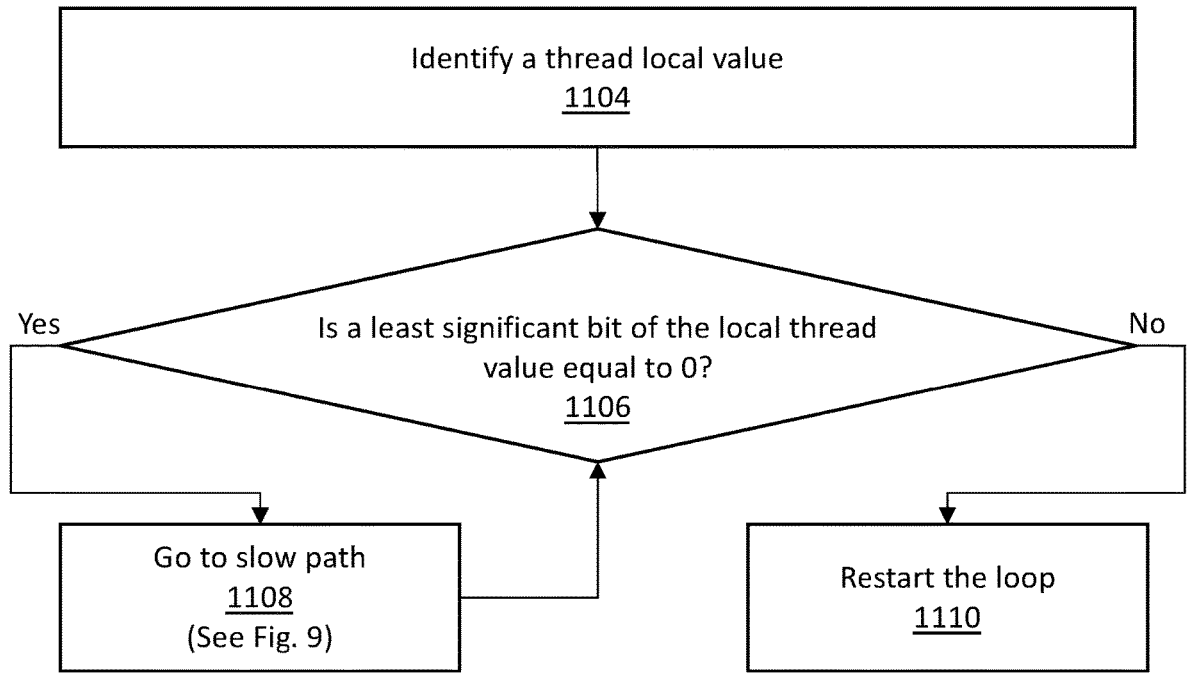
FIG. 11 illustrates an example set of operations for using a conditional branch before a back edge of a loop, in accordance with one or more embodiments.

FIG. 11 illustrates an example set of operations for using a conditional branch before a back edge of a loop, in accordance with one or more embodiments. Operations of FIG. 11 are executed after execution of a loop body. As described above, polling and back edge instructions are performed after execution of a loop body.

In one or more embodiments, operations of FIG. 11 are performed by a program process, which may be executed on a same thread or a different thread than an external process (such as, a garbage collection process).

One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include identifying a thread local value (Operation 1104). Examples of operations for identifying a thread local value are described above with reference to Operation 704.

One or more embodiments include determining whether a least significant bit (LSB) of the thread local value is equal to zero (Operation 1106). In an embodiment, the LSB of the thread local value serves as a flag for a loop condition. In another embodiment, a different bit of the thread local value may be used as a flag.

As described above with reference to FIGS. 8A-8C, when a safepoint or thread local handshake is needed, the thread local value is set to a minimum value (all 0's). Hence, the loop condition would return true. When a frame barrier is needed, the thread local value is set such that the LSB is 1. Hence, the loop condition would return false.

If the LSB of the thread local value is equal to zero, then one or more embodiments include going to a slow path (Operation 1108). Examples of operations of a slow path are further described below with reference to FIG. 9. After execution of the slow path, the program thread returns to a poll site. Polling is performed to determine whether an LSB of the thread local value is equal to zero (Operation 1106).

If the LSB of the thread local value is not equal to zero, then one or more embodiments include restarting the loop (Operation 1110). The program thread returns to the location of a beginning instruction for the loop.

10. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 12A-12D illustrate an example conditional branch frame barrier, in accordance with one or more embodiments.

Figure 12A:
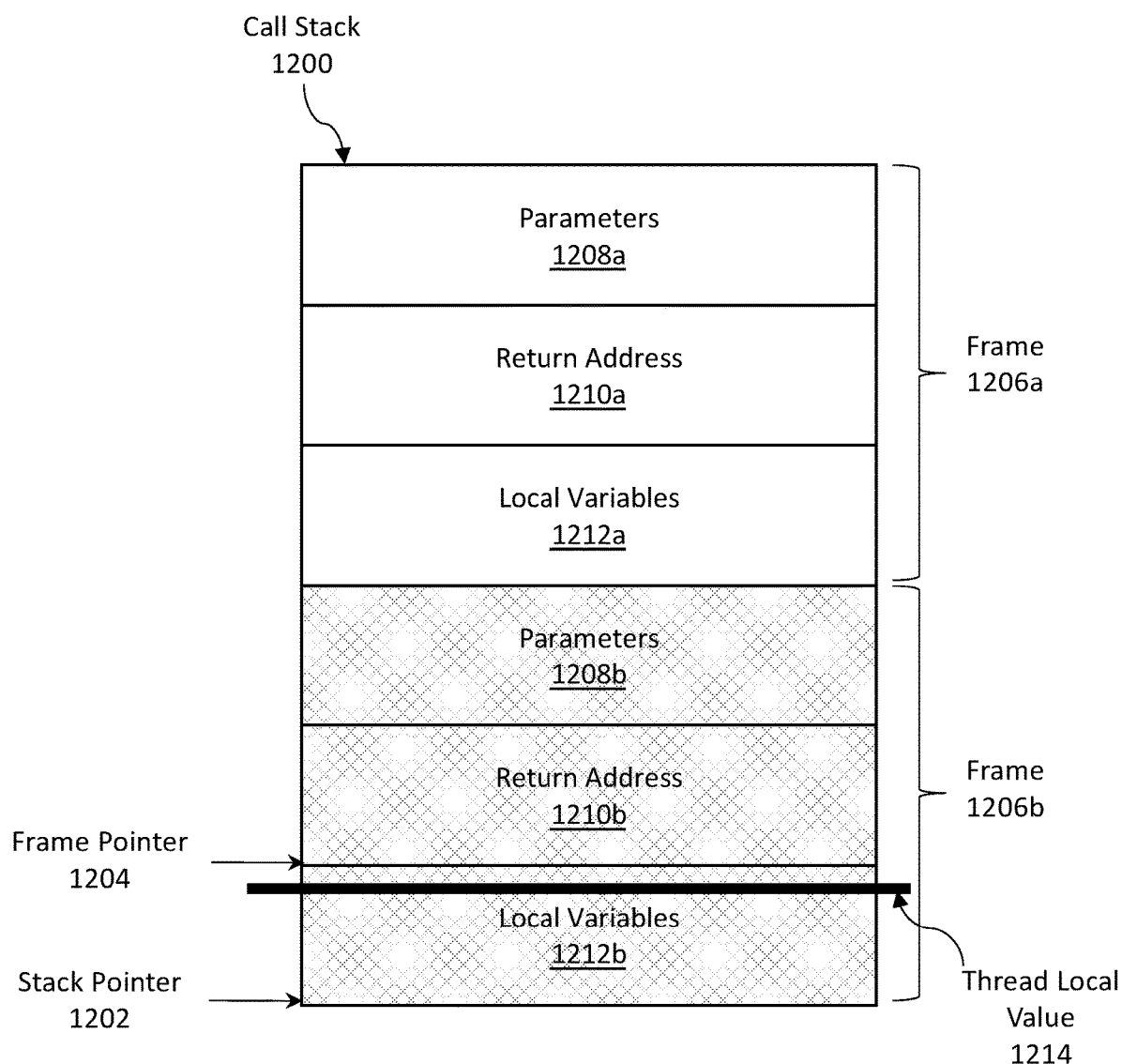
FIGS. 12A-12D illustrate an example conditional branch frame barrier, in accordance with one or more embodiments.

Referring to FIG. 12A, call stack 1200 is associated with a program thread. Frame 1206a, associated with Function A, is first pushed onto call stack 1200. Frame 1206b, associated with Function B, is then pushed onto call stack 1200.

Frame 1206a includes parameters 1208a for Function A, a return address 1210a to be used when exiting from Function A, and local variables 1212a associated with Function A. Frame 1206b includes parameters 1208b for Function B, a return address 1210b to be used when exiting from Function B, and local variables 1212b associated with Function B.

Stack pointer 1202 references a top of call stack 1200, which includes local variables 1212b of the active function, Function B. Frame pointer 1204 references a top of call stack 1200 before local variables 1212b were stored.

A GC thread is performing a GC cycle. The GC thread needs to traverse all frames on call stack 1200. As illustrated in FIG. 12A, frame 1206b (shaded in grey) has been traversed, while frame 1206a has not yet been traversed. The GC thread sets thread local value 1214 to indicate that frame 1206b has been traversed but frame 1206a has not yet been traversed. In particular, the GC thread sets thread local value 1214 to be equal to the address referenced by frame pointer 1204 minus seven.

Figure 12B:
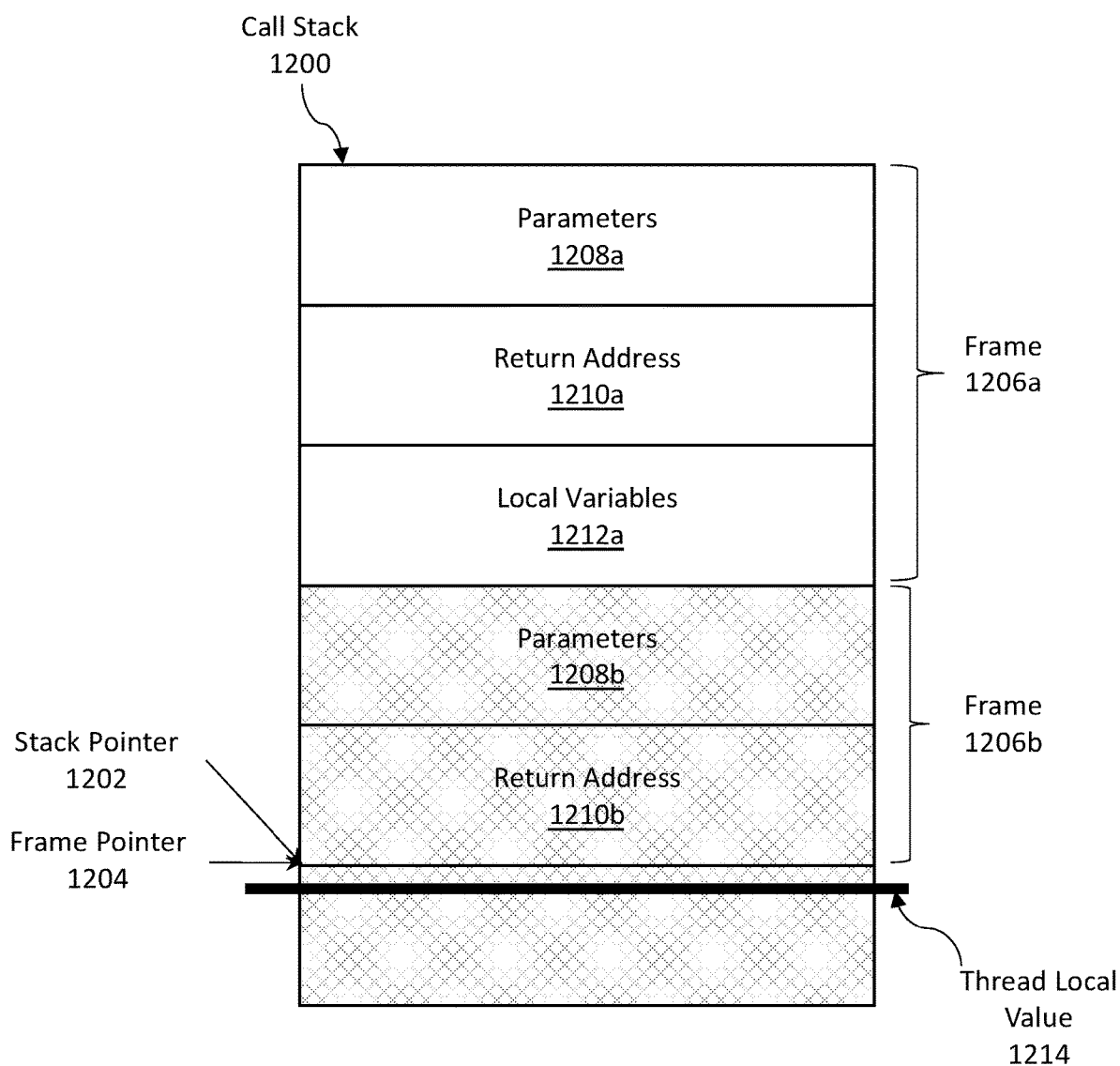

Referring to FIG. 12B, at a later time, execution of a function body of Function B is completed. During a function epilogue of Function B, stack pointer 1202 is set to a value of frame pointer 1204.

During the function epilogue, polling is conducted. Specifically, a return condition is checked. The return condition compares stack pointer 202 and thread local value 1214. If stack pointer 202 is greater than or equal to thread local value 1214, then a slow path is entered. In the current scenario, stack pointer 1202 is greater than or equal to thread local value 1214 (as illustrated, stack pointer 1202 is above thread local value 1214). Therefore, the slow path is entered.

Figure 12C:
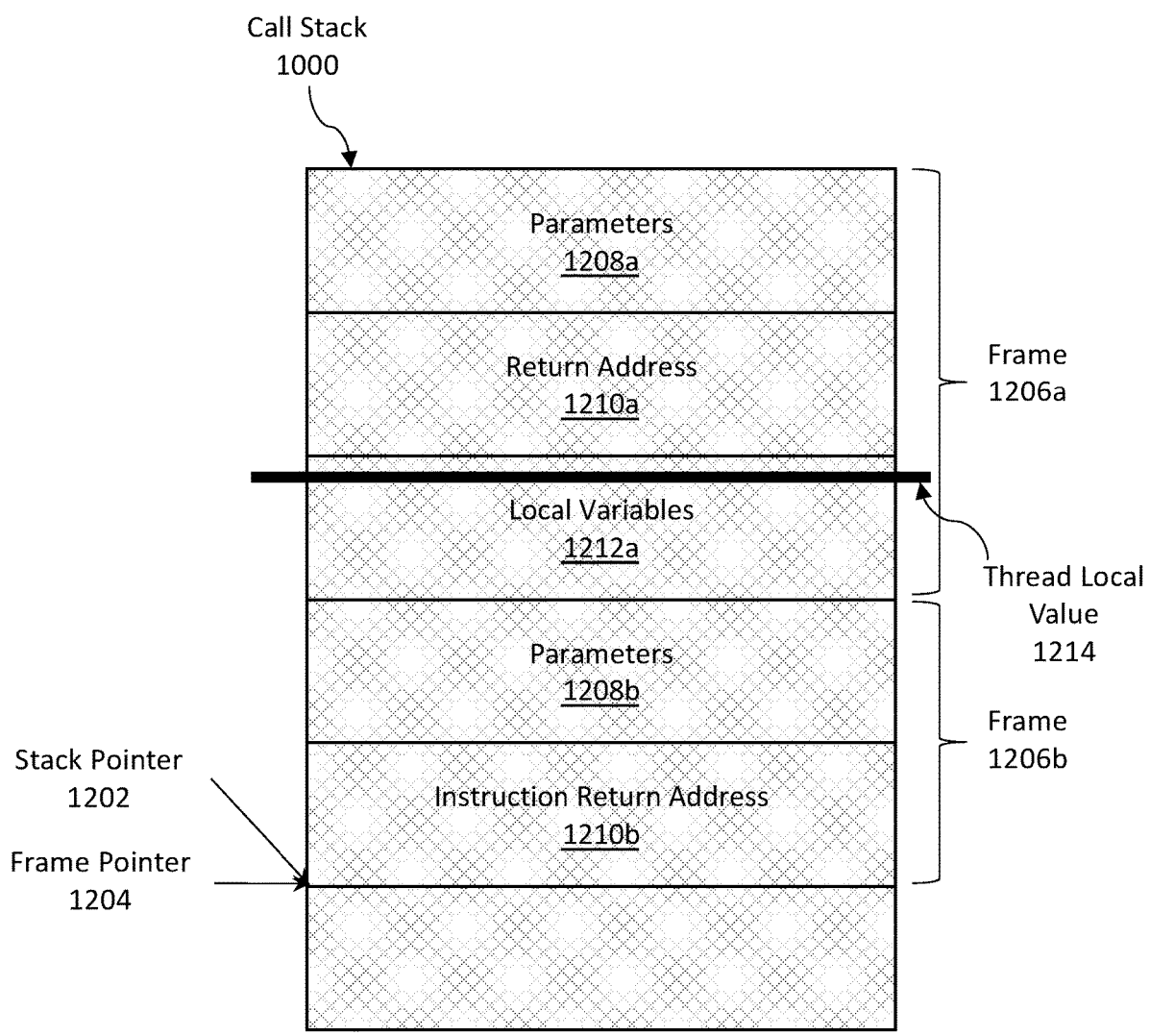

Referring to FIG. 12C, during execution of the slow path, the GC thread traverses frame 1206a (now also shaded in grey). The GC thread sets thread local value 1214 to indicate that frame 1206a has been traversed. In particular, the GC thread sets thread local value 1214 to be equal to the address referenced by a frame pointer associated with frame 1206a minus seven.

The program thread exits the slow path and returns to the poll site. The program thread again checks the return condition. The return condition compares stack pointer 202 and thread local value 1214. In the current scenario, stack pointer 1202 is not greater than or equal to thread local value 1214 (as illustrated, stack pointer 1202 is below thread local value 1214). Therefore, the slow path is not entered. The program thread returns to a call site for Function B.

Figure 12D:
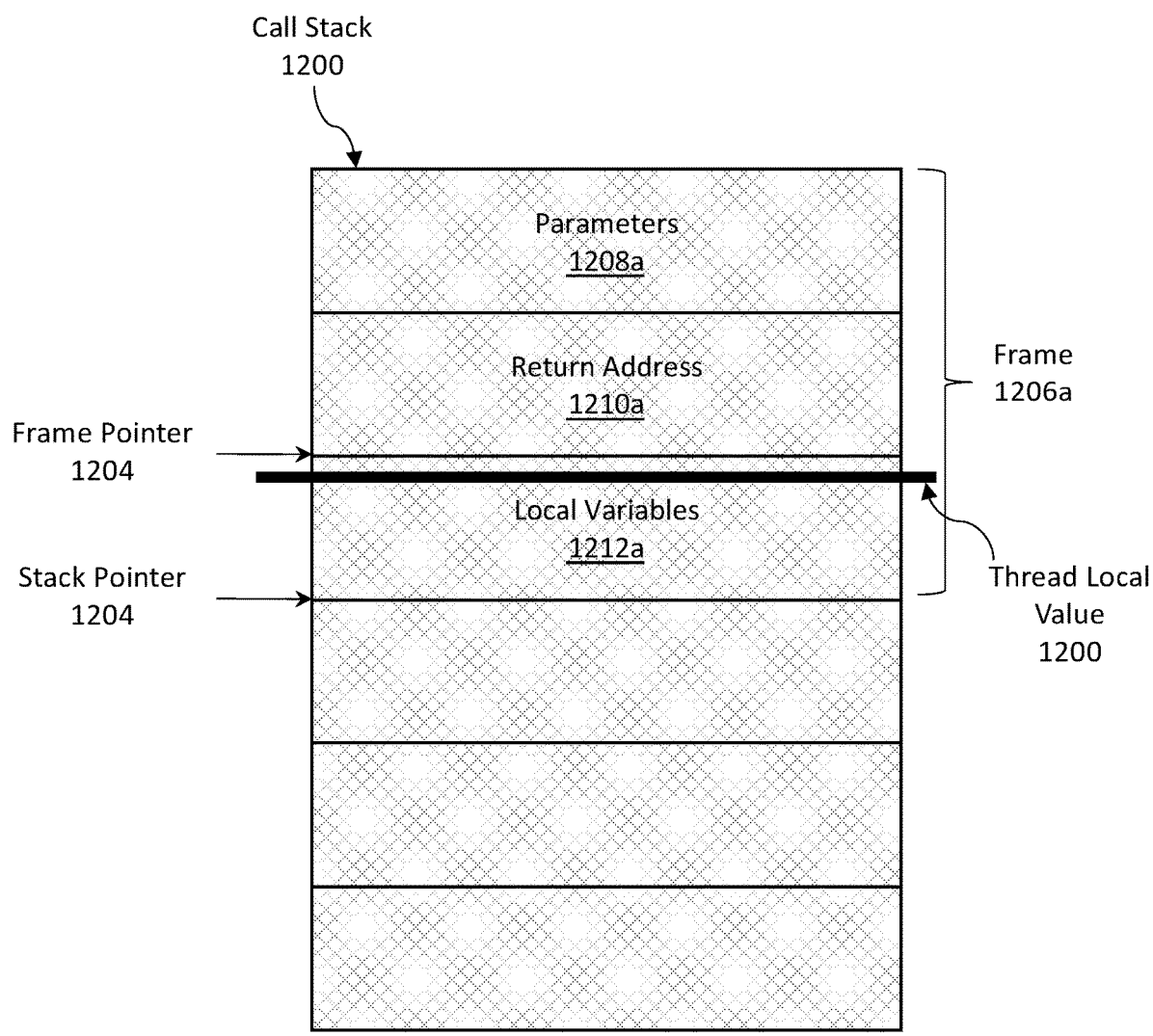
Figure 13:
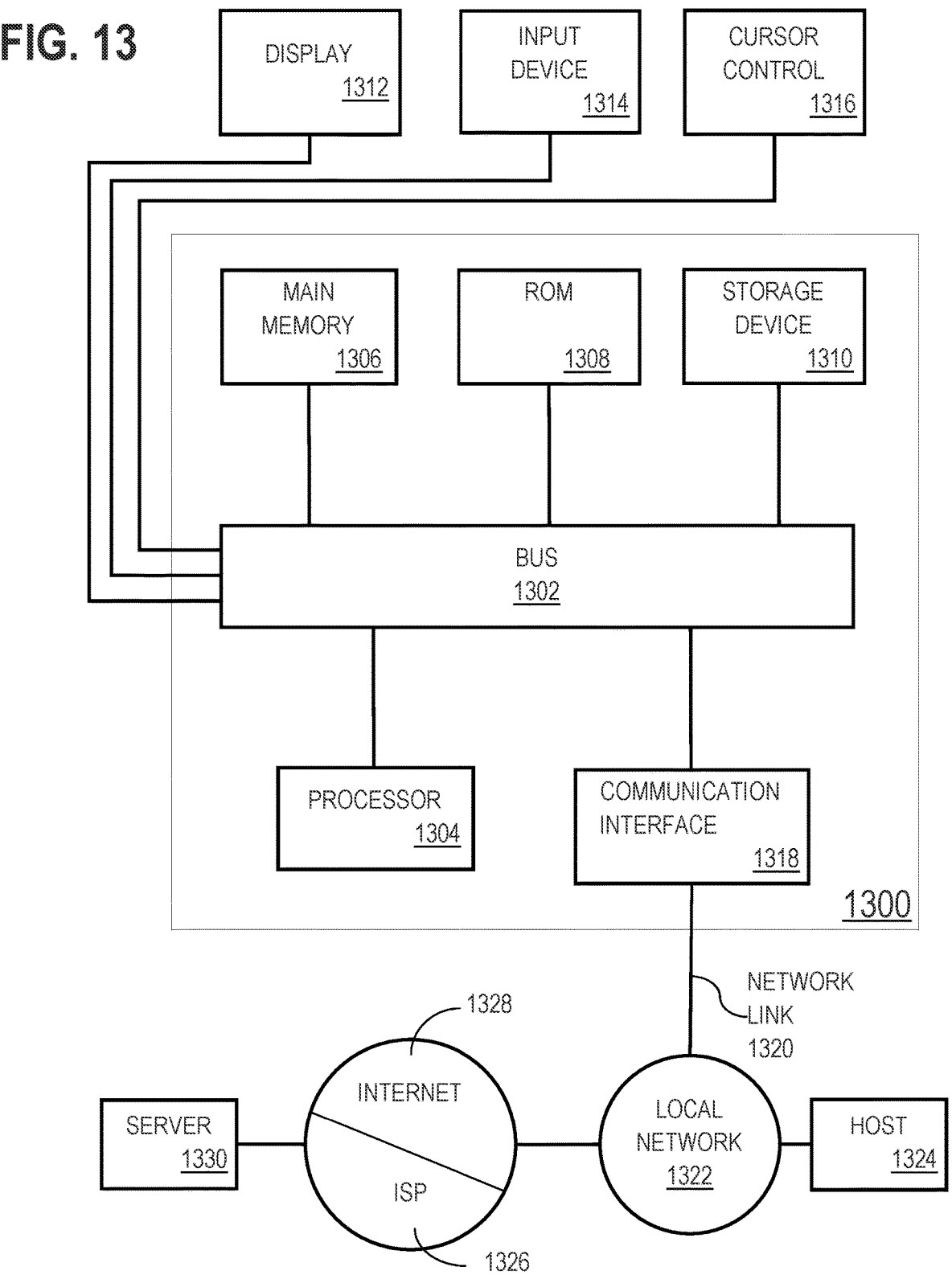
FIG. 13 shows a block diagram that illustrates a computer system, in accordance with one or more embodiments.

Referring to FIG. 12D, frame 1206b is popped from call stack 1200. Stack pointer 1204 references a top of call stack 1200, which includes local variables 1212a of the active function, Function A. Frame pointer 1204 references a top of call stack 1200 before local variables 1212a were stored.

Another detailed example is described below for purposes of clarity. Components and/or operations described below should be understood as one specific example which may not be applicable to certain embodiments. Accordingly, components and/or operations described below should not be construed as limiting the scope of any of the claims.

Source code for a loop may be as follows:

```
for (int x=0; x<n; x++) {
    System.out.println(x);
}
```

Machine code for a loop may be as follows:

```
       mov edx, 0 # edx is "x"
       movabs rsi, 0x643634 # address of System.out in heap
loop:  cmp edx, n
       jz loopend
       push edx
       call printli
       pop edx
       inc edx
       [polling: check a loop condition]
       jmp loop
loopend:
```

Initially, x is 0. At the first iteration of the loop, printli is called, and "0" is printed. The program counter reaches the polling instructions. A loop condition is checked. The loop condition checks whether a least significant bit (LSB) of a thread local value is equal to 0. The thread local value is identified. The LSB of the thread local value may be equal to 1. Therefore, the loop condition is not satisfied. Hence, the program counter reaches the back edge instructions, which require the program counter to jump back to the beginning of the loop.

Now, x is 1. At the second iteration of the loop, printli is called, and "1" is printed. At this time, a safepoint is needed. The thread local value is set to all 0's, and hence the LSB of the thread local value is 0. Referring back to the execution of the loop, the program counter reaches the polling instructions before the back edge. The loop condition is checked. The loop condition checks whether the LSB of the thread local value is equal to 0. The thread local value is identified. As stated above, the LSB of the thread local value is now equal to 0. Therefore, the loop condition is satisfied. Hence, the program process takes a slow path.

The slow path may involve the program thread and/or an external process performing operations triggering and/or requiring the safepoint. After the operations are complete, the thread local value is set to all 1's. The program thread returns to the poll site. The loop condition is again checked. Since the LSB of the thread local value is 1, the loop condition is not satisfied. Hence, the program counter reaches the back edge instructions, which require the program counter to jump back to the beginning of the loop.

Now, x is 2. At the second iteration of the loop, printli is called, and "2" is printed. At this time, a garbage collection process has started. The thread local value is set to track a progress of the traversal of frames by the garbage collection process. Additionally, the local thread value is set such that the LSB is 1. Referring back to the execution of the loop, the program counter reaches the polling instructions before the back edge. The loop condition is checked. The loop condition checks whether the LSB of the thread local value is equal to 0. The thread local value is identified. As stated above, the LSB of the thread local value is equal to 1. Therefore, the loop condition is not satisfied. Hence, the program counter reaches the back edge instructions, which require the program counter to jump back to the beginning of the loop.

11. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

12. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

What is claimed is:

1. One or more non-transitory computer-readable storage media storing instructions which, when executed by one or more hardware processors, cause:
    initiating a first process that traverses each of a plurality of frames on a call stack associated with a second process to perform a particular operation with respect to each of the plurality of frames on the call stack associated with the second process, wherein the plurality of frames includes a first frame associated with a first function, and a second frame associated with a second function that called the first function;
    completing performance of the particular operation with respect to the first frame;
    responsive at least to completing performance of the particular operation with respect to the first frame: setting a thread local value to a first value that is between (a) a first address corresponding to a first end of a first portion of the first frame that includes memory reserved for possible local variables of the first frame, and (b) a second address corresponding to a second end of a second portion of the first frame that does not include the memory reserved for the possible local variables of the first frame;
    subsequent to completing performance of the particular operation with respect to the first frame: completing performance of the particular operation with respect to the second frame;
    responsive at least to completing performance of the particular operation with respect to the second frame: set the thread local value to a second value that is between (a) a third address corresponding to a third end of a third portion of the second frame that includes memory reserved for possible local variables of the second frame, and (b) a fourth address corresponding to a fourth end of a fourth portion of the second frame that does not include the memory reserved for the possible local variables of the second frame.

2. The one or more non-transitory computer-readable storage media of claim 1, wherein the first value is (a) less than or equal to the third address and (b) greater than the fourth address.

3. The one or more non-transitory computer-readable storage media of claim 1, wherein the first value is (a) greater than or equal to the third address and (b) less than the fourth address.

4. The one or more non-transitory computer-readable storage media of claim 1, wherein the second portion of the first frame includes memory storing a return address associated with the first frame.

5. The one or more non-transitory computer-readable storage media of claim 1, wherein the first process performs completing performance of the particular operation with respect to the first frame and setting the thread local value to the first value.

6. The one or more non-transitory computer-readable storage media of claim 1, wherein the second process performs completing performance of the particular operation with respect to the first frame and setting the thread local value to the first value.

7. The one or more non-transitory computer-readable storage media of claim 1, further storing instructions comprising:
executing, by the second process, a function epilogue associated with the first function, wherein executing the function epilogue comprises:
moving a stack pointer from the first address to the second address;
determining whether the stack pointer was moved past the thread local value;
wherein completing performance of the particular operation with respect to the first frame is responsive at least to determining that the stack pointer was moved past the thread local value.

8. The one or more non-transitory computer-readable storage media of claim 7, wherein determining whether the stack pointer was moved past the thread local value comprises determining whether the stack pointer is greater than or equal to the thread local value.

9. The one or more non-transitory computer-readable storage media of claim 7, wherein determining whether the stack pointer was moved past the thread local value comprises determining whether the stack pointer is less than or equal to the thread local value.

10. The one or more non-transitory computer-readable storage media of claim 1, wherein the first process comprises one or more of: a garbage collection process, a deoptimization process, a stack sampling process, and a stack loading process.

11. The one or more non-transitory computer-readable storage media of claim 1, wherein the first value is equal to the second address minus seven.

12. The one or more non-transitory computer-readable storage media of claim 1, further storing instructions which cause:
responsive to determining that a safepoint or a thread local handshake is needed:
setting the thread local value to a maximum value.

13. The one or more non-transitory computer-readable storage media of claim 1, further storing instructions which cause:
responsive to determining that a safepoint or a thread local handshake is needed:
setting the thread local value to a minimum value.

14. The one or more non-transitory computer-readable storage media of claim 1, further storing instructions which cause:
prior to setting the thread local value to the first value:
executing, by the second process, a function epilogue of the first function, wherein the function epilogue comprises: determining whether a return condition is true based on a first comparison between a stack pointer and the thread local value;
responsive to determining that the return condition is true: establishing a frame barrier for the second frame by jumping to a third function rather than returning to the second function.

15. The one or more non-transitory computer-readable storage media of claim 1, further storing instructions which cause:
subsequent to setting the thread local value to the first value:
executing, by the second process, a function epilogue of the first function, wherein the function epilogue comprises: determining whether a return condition is true based on a first comparison between a stack pointer and the thread local value;
responsive to determining that the return condition is not true: returning to the second function.

16. The one or more non-transitory computer-readable storage media of claim 1, wherein the second address is referenced by a frame pointer while the first frame is active.

17. A system comprising:
one or more devices, each including one or more hardware processors; and
the system being configured to perform operations comprising:
initiating a first process that traverses each of a plurality of frames on a call stack associated with a second process to perform a particular operation with respect to each of the plurality of frames on the call stack associated with the second process, wherein the plurality of frames includes a first frame associated with a first function, and a second frame associated with a second function that called the first function;
completing performance of the particular operation with respect to the first frame;
responsive at least to completing performance of the particular operation with respect to the first frame: setting a thread local value to a first value that is between (a) a first address corresponding to a first end of a first portion of the first frame that includes memory reserved for possible local variables of the first frame, and (b) a second address corresponding to a second end of a second portion of the first frame that does not include the memory reserved for the possible local variables of the first frame;
subsequent to completing performance of the particular operation with respect to the first frame: completing performance of the particular operation with respect to the second frame;
responsive at least to completing performance of the particular operation with respect to the second frame: set the thread local value to a second value that is between (a) a third address corresponding to a third end of a third portion of the second frame that includes memory reserved for possible local variables of the second frame, and (b) a fourth address corresponding to a fourth end of a fourth portion of the second frame that does not include the memory reserved for the possible local variables of the second frame.

18. A method, comprising:
initiating a first process that traverses each of a plurality of frames on a call stack associated with a second process to perform a particular operation with respect to each of the plurality of frames on the call stack associated with the second process, wherein the plurality of frames includes a first frame associated with a first function, and a second frame associated with a second function that called the first function;

completing performance of the particular operation with respect to the first frame;

responsive at least to completing performance of the particular operation with respect to the first frame: setting a thread local value to a first value that is between (a) a first address corresponding to a first end of a first portion of the first frame that includes memory reserved for possible local variables of the first frame, and (b) a second address corresponding to a second end of a second portion of the first frame that does not include the memory reserved for the possible local variables of the first frame;

subsequent to completing performance of the particular operation with respect to the first frame: completing performance of the particular operation with respect to the second frame;

responsive at least to completing performance of the particular operation with respect to the second frame: set the thread local value to a second value that is between (a) a third address corresponding to a third end of a third portion of the second frame that includes memory reserved for possible local variables of the second frame, and (b) a fourth address corresponding to a fourth end of a fourth portion of the second frame that does not include the memory reserved for the possible local variables of the second frame;

wherein the method is performed by one or more devices, each including one or more hardware processors.

19. The method of claim 18, wherein the first value is (a) less than or equal to the third address and (b) greater than the fourth address.

20. The method of claim 18, wherein the first value is (a) greater than or equal to the third address and (b) less than the fourth address.

* * * * *

UNITED STATES PATENT AND TRADEMARK OFFICE
CERTIFICATE OF CORRECTION

| | |
|---|---|
| PATENT NO. | : 11,249,758 B2 |
| APPLICATION NO. | : 17/143145 |
| DATED | : February 15, 2022 |
| INVENTOR(S) | : Osterlund |

It is certified that error appears in the above-identified patent and that said Letters Patent is hereby corrected as shown below:

On the Title Page

In the illustrative figure, Reference Numeral 706, Line 2, delete "equal the" and insert -- equal to the --.

On page 2, Column 1, under Other Publications, Line 8, delete "Main--Main--" and insert -- Main-- --, therefor.

On page 2, Column 2, under Other Publications, Line 16, delete "Open JDK," and insert -- OpenJDK, --, therefor.

In the Drawings

On sheet 7 of 16, in Fig. 7, under Reference Numeral 706, Line 2, delete "equal the" and insert -- equal to the --, therefor.

In the Specification

In Column 13, Line 20, delete ""11/17/2011";" and insert -- "11/17/2011". --, therefor.

In Column 14, Line 60, delete "concurrent)" and insert -- concurrent). --, therefor.

Signed and Sealed this
Nineteenth Day of July, 2022

Katherine Kelly Vidal
*Director of the United States Patent and Trademark Office*